(12) United States Patent
Trakhimovich

(10) Patent No.: US 11,946,795 B2
(45) Date of Patent: *Apr. 2, 2024

(54) WEIGHING LOAD CELLS AND ARRANGEMENTS EMPLOYING THEM IN SHELVES

(71) Applicant: SHEKEL SCALES (2008) LTD., Beit Keshet (IL)

(72) Inventor: Michael Trakhimovich, Gan Ner (IL)

(73) Assignee: SHEKEL SCALES (2008) LTD., Beit Keshet (IL)

( * ) Notice: Subject to any disclaimer, the term of this patent is extended or adjusted under 35 U.S.C. 154(b) by 716 days.

This patent is subject to a terminal disclaimer.

(21) Appl. No.: 17/098,565

(22) Filed: Nov. 16, 2020

(65) Prior Publication Data

US 2021/0131857 A1 May 6, 2021

Related U.S. Application Data

(63) Continuation-in-part of application No. PCT/IB2019/054082, filed on May 16, 2019.

(30) Foreign Application Priority Data

May 16, 2018 (GB) ..................................... 1807918
Sep. 6, 2018 (GB) ..................................... 1814504

(51) Int. Cl.
*G01G 19/52* (2006.01)
*G01G 19/414* (2006.01)
(Continued)

(52) U.S. Cl.
CPC ............. *G01G 19/52* (2013.01); *G01G 19/42* (2013.01); *G01L 1/2206* (2013.01);
(Continued)

(58) Field of Classification Search
CPC ........ G01G 19/52; G01G 19/42; G01G 21/28; G01G 21/23; G01G 19/4144; G01L 1/2206; G01L 1/183; G06Q 10/087
(Continued)

(56) References Cited

U.S. PATENT DOCUMENTS 1,012,121 A * 12/1911 De Bonet et al. .. F16L 37/1215
285/34
3,927,132 A 12/1975 Willis et al.
(Continued)

FOREIGN PATENT DOCUMENTS

CA 2071223 A1 6/1991
CN 2276152 Y 3/1998
(Continued)

OTHER PUBLICATIONS

Written Opinion for PCT/IB2020/062590 dated Apr. 22, 2021.
(Continued)

*Primary Examiner* — Jacques M Saint Surin
(74) *Attorney, Agent, or Firm* — Momentum IP; Marc Van Dyke

(57) ABSTRACT

A weighing assembly having first and second shelf brackets supporting first and second planar load cell assemblies, each planar load cell assembly having at least one load cell arrangement disposed on a metal load cell body, each load cell arrangement including first and second contiguous cut-out windows passing through the load cell body, a pair of measuring beams disposed along opposite edges of the load cell body, a first flexure arrangement having a first pair of flexure beams, a loading element comprising a receiving element and extending from an innermost flexure base, and at least one strain gage, fixedly attached to a surface of the measuring beam.

17 Claims, 17 Drawing Sheets

(51) Int. Cl.
  *G01G 19/42* (2006.01)
  *G01G 21/23* (2006.01)
  *G01G 21/28* (2006.01)
  *G01L 1/22* (2006.01)
  *G06Q 10/087* (2023.01)

(52) U.S. Cl.
  CPC ....... *G06Q 10/087* (2013.01); *G01G 19/4144* (2013.01); *G01G 21/23* (2013.01); *G01G 21/28* (2013.01)

(58) Field of Classification Search
  USPC ......................................................... 177/211
  See application file for complete search history.

(56) References Cited

U.S. PATENT DOCUMENTS

| | | | |
|---|---|---|---|
| 3,927,139 | A | 12/1975 | Bozer et al. |
| 4,542,800 | A | 9/1985 | Knothe et al. |
| 4,548,086 | A | 10/1985 | Kastel |
| 4,600,066 | A | 7/1986 | Griffen et al. |
| 5,199,814 | A | 4/1993 | Clark et al. |
| 5,510,581 | A | 4/1996 | Angel |
| 5,651,616 | A | 7/1997 | Hustak et al. |
| 5,671,362 | A | 9/1997 | Cowe |
| 5,929,391 | A * | 7/1999 | Petrucelli ............... G01G 3/13 177/229 |
| 6,555,767 | B1 | 4/2003 | Lockery et al. |
| 7,679,009 | B2 | 3/2010 | Weichao |
| 8,648,267 | B2 | 2/2014 | Honda et al. |
| 8,664,547 | B2 * | 3/2014 | Werner ................... G01G 3/10 177/229 |
| 9,046,408 | B2 | 6/2015 | Chan |
| 9,695,101 | B2 | 7/2017 | Shaver et al. |
| 9,766,113 | B2 | 9/2017 | Trakhimovich |
| 10,007,892 | B1 | 6/2018 | Hahn et al. |
| 10,126,186 | B2 | 11/2018 | Berme et al. |
| 10,198,710 | B1 | 2/2019 | Hahn et al. |
| 10,274,359 | B2 | 4/2019 | Trakhimovich |
| 10,527,508 | B2 | 1/2020 | Berme et al. |
| 10,614,415 | B1 * | 4/2020 | De Bonet ............ A47B 96/028 |
| 10,641,643 | B2 | 5/2020 | Trakhimovich |
| 10,704,951 | B2 | 7/2020 | Trakhimovich |
| 10,765,936 | B2 | 9/2020 | Berme et al. |
| 10,816,419 | B2 | 10/2020 | Lisiak |
| 11,092,477 | B2 | 8/2021 | Trakhimovich |
| 11,493,268 | B2 * | 11/2022 | Ryu ....................... F25D 25/025 |
| 11,607,059 | B2 * | 3/2023 | Fritsch .................. A47F 5/0018 |
| 11,609,132 | B2 * | 3/2023 | Fritsch .................. G01G 21/244 |
| 2003/0047603 | A1 | 3/2003 | Lustenberger et al. |
| 2004/0238236 | A1 | 12/2004 | Linglin et al. |
| 2005/0061553 | A1 | 3/2005 | Wang et al. |
| 2005/0145032 | A1 | 7/2005 | Takeuchi et al. |
| 2006/0051553 | A1 | 3/2006 | Kaplo et al. |
| 2007/0069867 | A1 | 3/2007 | Fleisch et al. |
| 2008/0022784 | A1 | 1/2008 | Wehinger et al. |
| 2008/0140087 | A1 | 6/2008 | Barbagli |
| 2013/0220709 | A1 | 8/2013 | Trakhimovich |
| 2014/0291042 | A1 | 10/2014 | Tsutaya et al. |
| 2015/0096387 | A1 | 4/2015 | Berme et al. |
| 2015/0107913 | A1 | 4/2015 | Trakhimovich |
| 2015/0314507 | A1 | 11/2015 | Jang |
| 2016/0048798 | A1 | 2/2016 | Meyer et al. |
| 2016/0363475 | A1 | 12/2016 | Bedetti et al. |
| 2017/0199073 | A1 | 7/2017 | Carreel et al. |
| 2017/0211965 | A1 | 7/2017 | Trakhimovich |
| 2017/0249587 | A1 | 8/2017 | Jones et al. |
| 2018/0031412 | A1 | 2/2018 | Trakhimovich |
| 2019/0015702 | A1 | 1/2019 | Krebs et al. |
| 2019/0301921 | A1 | 10/2019 | Trakhimovich |
| 2019/0324441 | A1 | 10/2019 | Cella et al. |
| 2020/0326225 | A1 | 10/2020 | Trakhimovich |
| 2021/0131857 | A1 * | 5/2021 | Trakhimovich ..... G06Q 10/087 |
| 2021/0148750 | A1 | 5/2021 | Trakhimovich |
| 2021/0148751 | A1 * | 5/2021 | Yadai ..................... G01G 19/52 |
| 2021/0334739 | A1 * | 10/2021 | O'Neil .................. G01G 19/42 |
| 2022/0011150 | A1 | 1/2022 | Trakhimovich |

FOREIGN PATENT DOCUMENTS

| | | |
|---|---|---|
| CN | 2436383 Y | 6/2001 |
| CN | 2676166 Y | 2/2005 |
| CN | 1869610 A | 11/2006 |
| CN | 2874442 Y | 2/2007 |
| CN | 203572558 U | 4/2014 |
| CN | 104395715 A | 3/2015 |
| CN | 105102056 A | 11/2015 |
| CN | 205483198 U | 8/2016 |
| CN | 206339001 U | 7/2017 |
| CZ | 31014 U1 | 9/2017 |
| DE | 102006024385 A1 | 12/2006 |
| EP | 0505493 A1 | 9/1992 |
| EP | 0742426 A1 | 11/1996 |
| EP | 0771410 A1 | 5/1997 |
| EP | 0789232 A2 | 8/1997 |
| EP | 1345016 A1 | 9/2003 |
| EP | 2784451 A1 | 10/2014 |
| EP | 2784452 A1 | 10/2014 |
| EP | 3070607 A1 | 9/2016 |
| EP | 3729018 A1 | 10/2020 |
| EP | 3815013 A1 | 5/2021 |
| EP | 3818345 A1 | 5/2021 |
| GB | 2528897 A | 2/2016 |
| JP | H08110260 A | 4/1996 |
| WO | 2013059716 A2 | 4/2013 |
| WO | 2013164675 A1 | 11/2013 |
| WO | 2016181352 A1 | 11/2016 |
| WO | 2019024951 A1 | 2/2019 |

OTHER PUBLICATIONS

International Search Report for PCT/IB2020/062590 dated Apr. 22, 2021.
Co-pending U.S. Appl. No. 17/789,195, inventor Ehud Hahamy, filed Jun. 26, 2022.
International Search Report for PCT/IB2019055488 dated Feb. 1, 2020.
Written Opinion for PCT/IB2019055488 dated Feb. 1, 2020.
International Search Report for PCT/IB2019054746 dated Dec. 12, 2019.
Written Opinion for PCT/IB2019054746 dated Dec. 12, 2019.
International Search Report for PCT/IB2020055761 dated Dec. 30, 2020.
Written Opinion for PCT/IB2020055761 dated Dec. 30, 2020
International Search Report for PCT/IB2018/060588 dated Jun. 27, 2019.
Written Opinion for PCT/IB2018/060588 dated Jun. 27, 2019.
International Search Report for PCT/IB2019054082 dated Nov. 21, 2019.
Written Opinion for PCT/IB2019054082 dated Nov. 21, 2019.
JPH08110260 Machine Translation (by google translate)—published Apr. 30, 1996.
CZ31014 Machine Translation (by google translate)—published Sep. 12, 2017.
DE102006024385 Machine Translation (by google translate)—published Dec. 21, 2006.
CN104395715 Machine Translation (by google translate)—published Jun. 12, 1991.
CN 105102056 Machine Translation (by google translate)—published Nov. 25, 2015.
CN 1869610 Machine Translation (by google translate)—published Nov. 29, 2006.
CN203572558 Machine Translation (by google translate)—published Apr. 30, 2014.
CN205483198 Machine Translation (by google translate)—published Aug. 17, 2016.
CN 206339001 Machine Translation (by google translate)—published Jul. 18, 2017.

(56) References Cited

OTHER PUBLICATIONS

CN 2276152 Machine Translation (by google translate)—published Mar. 11, 1998.
CN 2436383 Machine Translation (by google translate)—published Jun. 27, 2001.
CN 2676166 Machine Translation (by google translate)—published Feb. 2, 2005.
CN 2874442 Machine Translation (by google translate)—published Feb. 28, 2007.
Magnesium AM60B Cast Alloy M10602 by AZoMJul. 29, 2013: https://www.azom.com/article.aspx?ArticleID=9237 (Year: 2013).
Overview of materials for 2000 Series Aluminium Alloy, MATWEB http://www.matweb.com/search/DataSheet.aspx?MatGUID=2076184469d740af9f86b-0d69b2e42ff (Year: 2020).

* cited by examiner

CLOSE-UP OF SHIM 130

CLOSE-UP OF LOAD CELL ASSEMBLY 100

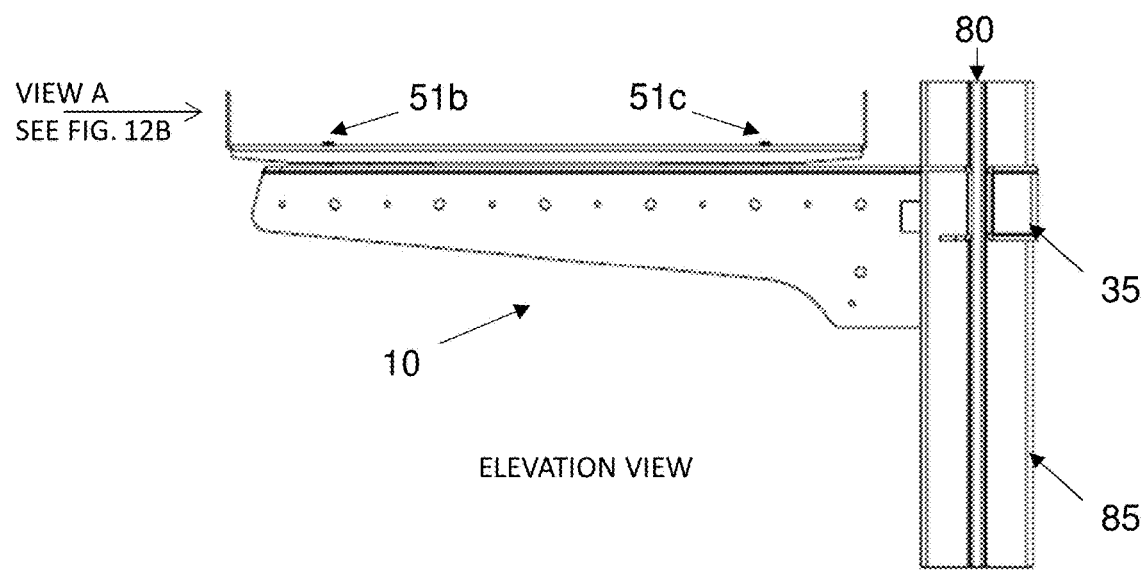
FIG. 12A
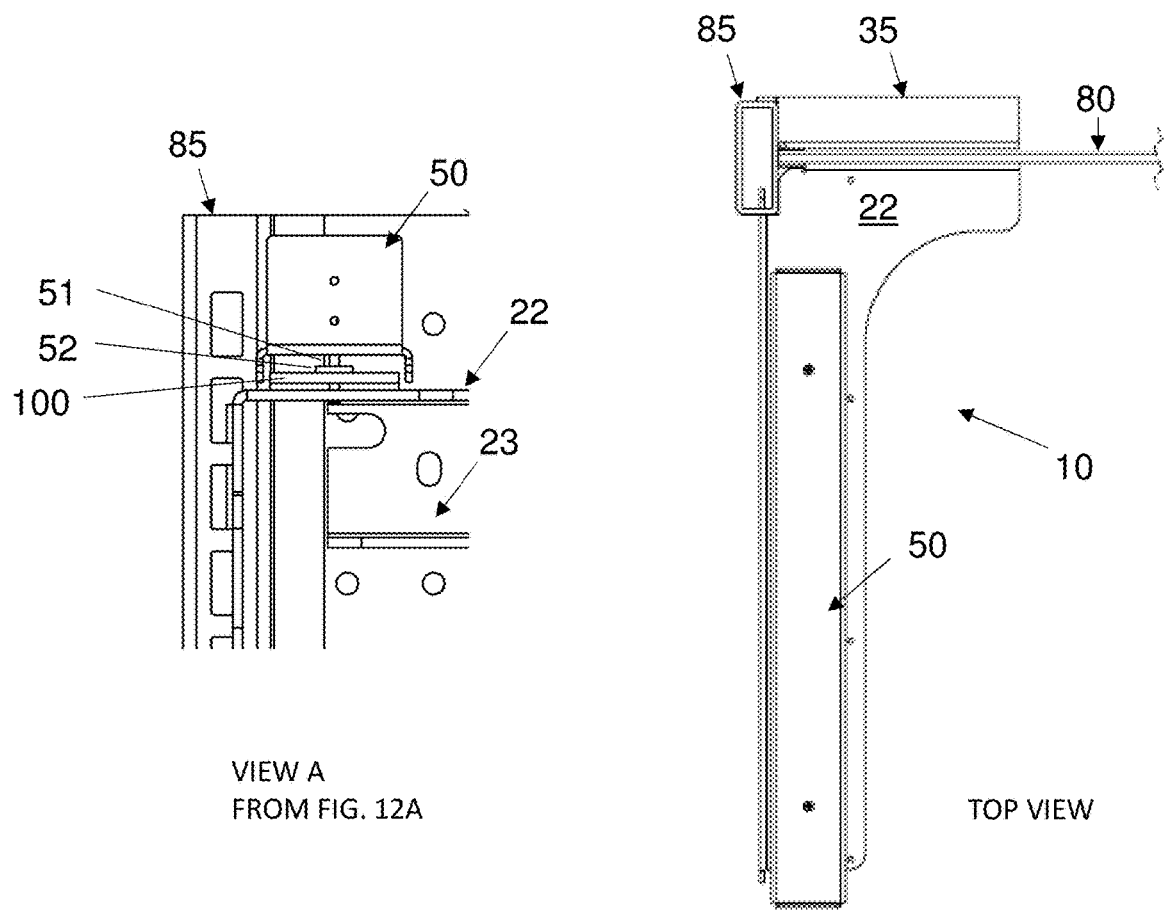
FIG. 12B
FIG. 12C

WEIGHING LOAD CELLS AND ARRANGEMENTS EMPLOYING THEM IN SHELVES

CROSS-REFERENCE TO RELATED APPLICATIONS

This application is a continuation-in-part of International Patent Application No. PCT/IB2019/054082 filed on May 16, 2019, and published as WO/2019220400 on Nov. 21, 2019, which is incorporated by reference for all purposes as if fully set forth herein. This invention claims priority from the following patent applications: Great Britain Patent Application No. 1807918.6, filed on May 16, 2018; Great Britain Patent Application No. 1814504.5, filed on Sep. 6, 2018; and International Application No. PCT/IB2018/060588, filed on Dec. 24, 2018, all of which applications are incorporated by reference for all purposes as if fully set forth herein.

FIELD OF THE INVENTION

The present invention relates to weighing devices and assemblies, including weighing devices and assemblies incorporating planar weighing devices employing load cell assemblies having integral flexures, and related systems and methods for their use in tracking inventory of products and facilitating autonomous retail sales transactions.

BACKGROUND

Load cells are employed extensively in weighing scales because of their accuracy in measuring weights, and they are often deployed in industrial and commercial applications to perform reliable weight measurements.

Unattended or autonomous retail and inventory management are areas that can benefit from the use of load cells. Technical solutions have been suggested for intelligent shelving that would track the weight of products on a shelf, including changes in the weight resulting from the addition of products or the removal of products. An example of such a suggested solution is a shelf segment assembly with load cells attached to the underside so that when the shelf segment is placed atop an existing 'regular' shelf, weights of the products on the shelf can be tracked. Such solutions are lacking in terms of immobilizing and stabilizing the intelligent shelves, integrating with existing shelving systems such as, for example, so-called 'gondola' shelving units, and providing solutions for large-scale arrangements of shelving units such as those in large supermarkets or department stores. Additionally, such solutions could benefit from the introduction of very accurate and small-size load cell assemblies.

Planar load cells suitable for use in or in conjunction with the present invention have been described in co-pending application Great Britain Patent Application No. 1814504.5.

Other suitable planar load cell designs have been disclosed, including in U.S. Pat. Nos. 5,510,581, 6,230,571 and 7,679,009, the teachings of all of which are incorporated herewith by reference in their entireties.

SUMMARY

Embodiments relate to weighing assemblies that include shelf brackets, to weighing-enabled shelving arrangements, and methods for their assembly and use.

In embodiments, a weighing assembly includes first and second planar load cell assemblies, said first planar load cell assembly comprising at least a first load cell arrangement disposed on a first metal load cell body, said second planar load cell assembly comprising at least a second load cell arrangement disposed on a second metal load cell body; each of said first and second metal load cell bodies having a primary axis, a central longitudinal axis, and a transverse axis disposed transversely with respect to said primary and central longitudinal axes, a broad dimension of said first and second load cell bodies being disposed perpendicular to said primary axis, each of said first and second load cell arrangements including: a first contiguous cutout window passing through said broad dimension and formed by a first pair of cutout lines disposed generally parallel to said central longitudinal axis, and connected by a first cutout base; a second contiguous cutout window passing through said broad dimension and formed by a second pair of cutout lines disposed generally parallel to said central longitudinal axis, and connected by a second cutout base, wherein said second contiguous cutout window is transversely bounded by said first contiguous cutout window; a pair of measuring beams disposed along opposite edges of said load cell body and generally parallel to said central longitudinal axis, each of said measuring beams longitudinally defined by a respective cutout line of said first pair of cutout lines; a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base; a loading element, longitudinally defined by an innermost pair of cutout lines, comprising a receiving element and extending from an innermost flexure base, said transverse axis passing through said loading element; and at least one strain gage, fixedly attached to a surface of a measuring beam of said measuring beams; and first and second shelf brackets, said first shelf bracket attached to said first metal load cell body at an anchored end thereof, and said second shelf bracket attached to said second metal load cell body at an anchored end thereof.

In some embodiments, the weighing assembly can additionally comprise a shelf frame joining the first and second shelf brackets so as to form, in combination therewith, a rigid shelf frame.

In some embodiments, the weighing assembly can additionally comprise (vii) a third contiguous cutout window passing through said broad dimension and formed by a third pair of cutout lines disposed parallel to said central longitudinal axis, and connected by a third cutout base; and (viii) a second flexure arrangement having a second pair of flexure beams, disposed along opposite sides of said central longitudinal axis, and parallel thereto, said second pair of flexure beams longitudinally disposed between said second pair of cutout lines and said third pair of cutout lines, and mechanically connected by a second flexure base, wherein said loading element is longitudinally defined by said third pair of cutout lines, and extending from said second flexure base.

In some embodiments, the weighing assembly can additionally comprise a plurality of protruding elements, wherein, in an assembled configuration, each one of the plurality of protruding elements is vertically aligned with a corresponding receiving element.

In some embodiments, the weighing assembly can additionally comprise a shelf installed upon an upward-facing surface of said rigid shelf frame.

In some embodiments, the weighing assembly can further comprise an upright having a securing arrangement for securing one of said first and second shelf brackets thereto. In some such embodiments, it can be that (i) each one of the first and second shelf brackets includes at least one bracket hook and (ii) wherein the securing arrangement of each one of said pair of uprights is adapted to receive said at least one bracket hook.

In some embodiments, at least one of the first and second load cell assemblies comprises a double ended load cell.

In some embodiments, said at least one strain-sensing gage being associated with a processing unit configured to receive strain signals therefrom, and to produce a weight indication based on said strain signals.

In some embodiments, the weighing assembly can additionally comprise a communications arrangement for sending information about the weight indication to a computing device. In some such embodiments, the weighing assembly can additionally comprise the computing device, and the computing device can include a software module for determining, based on the information, that a product has been added to or removed from a shelf. In some such embodiments, the product can be a member of a group of products characterized by a plurality of SKU-identifiers, and the determining by the software module additionally can include determining the SKU-identifier of the product that has been added or removed from the shelf. In some such embodiments, the result of the determining by the software module is further used to perform at least one of a retail sales transaction and an inventory adjustment in a computerized inventory system. In some embodiments, the product is a member of a group of non-homogeneous products, and the determining by the software module can additionally include identifying the product that has been added or removed from the shelf. In some such embodiments, the group of non-homogeneous products can be characterized by a plurality of SKU-identifiers, and/or the identifying can include identifying a SKU-identifier.

In embodiments, a shelving arrangement, which has at least one load cell assembly, comprises: (a) a shelving unit including (i) a back panel and (ii) at least one upright associated with said back panel; (b) a weighing assembly comprising first and second planar load cell assemblies, each planar load cell assembly including: (i) a load cell body having a free end and an anchored portion, said load body including a spring element and at least one receiving element adapted, in an operative mode, to receive a vertical load, said receiving element having an unloaded disposition and a loaded disposition in which said free end is depressed with respect to said free end in said unloaded disposition, and (ii) at least one strain-sensing gage, bonded to said spring element, said strain-sensing gage adapted to measure a strain in said spring element, in said loaded disposition; and the shelving arrangement additionally comprises (c) first and second load cell bases each including a respective shelf bracket, where a respective one of said first and second load cell bases is attached to each said load cell body at an anchored end thereof, each said shelf bracket including at least one attachment member, said upright having a securing arrangement for securing each said shelf bracket thereto using said at least one attachment member.

In some embodiments, the shelving arrangement can additionally comprise a communications arrangement for sending information about the weight indication to a computing device.

A method is disclosed herein for tracking inventory of products displayed on shelving comprising weighing assemblies; the method comprises: (a) storing products characterized by a plurality of SKU-identifiers on a shelf comprising a weighing assembly, the weighing assembly comprising first and second shelf brackets and first and second load cell assemblies, each including (i) a planar load cell body having a free end and an anchored portion, the load cell body including a spring element and at least one receiving element, (ii) a strain-sensing gage, bonded to said spring element, said strain-sensing gage adapted to measure a strain in said spring element, in said loaded disposition, and (iii) a load cell base including a respective one of said first and second shelf brackets; (b) tracking the weight of the products on the shelf, using said first and second load cell assemblies; (c) in response to a change in weight of the products on the shelf, sending information about the weight of the products from the load cell assembly to a computing device; and (d) in response to receiving the information about the weight of the products: (i) determining, by the computing device, that a product has been added to or removed from the shelf, and (ii) in response to the determining that a product has been added to or removed from the shelf, further determining an SKU-identifier of the product added or removed.

In some embodiments, the method can additionally comprise the step of recording a change in an inventory management system.

In some embodiments, the method can additionally comprise the step of completing a retail sales transaction, using the result of the determining and of the further determining.

In embodiments, a weighing assembly that includes a shelf bracket comprises a receiving bracket adapted to receive a shelf; a load cell assembly including (i) a load cell body having a free end and an anchored portion, said load cell body including a spring element and at least one receiving element, and (ii) a strain-sensing gage, bonded to said spring element, said strain-sensing gage adapted to measure a strain in said spring element; in said loaded disposition; and a load cell base including the shelf bracket. In an assembled configuration, said load cell base is attached to said load cell body at said anchored portion thereof, and in said assembled configuration, said at least one receiving element is adapted to receive a vertical load from said receiving bracket, said receiving element has an unloaded disposition and a loaded disposition in which said at least one receiving element receives said vertical load, wherein in said loaded position, said free end attains a depressed position with respect to said free end in said unloaded disposition.

In some embodiments, the weighing assembly can additionally comprise at least one protruding element, wherein, in said assembled configuration, the at least one protruding element is disposed on said receiving bracket and is vertically aligned with said at least one receiving element.

In some embodiments, the weighing assembly can additionally comprise at least one protruding element, wherein, in said assembled configuration, the at least one protruding element is disposed on said receiving element and is vertically aligned with said at least one protruding-element receptacle in said receiving bracket.

In some embodiments, the weighing assembly can additionally comprise the shelf, wherein, in said assembled configuration, the shelf is disposed atop the receiving bracket such that said receiving bracket bears an entire weight of the shelf, and in some embodiments of the weighing assembly the receiving bracket can include an elongated horizontal member and a plurality of vertical members, at least some of the plurality of vertical members being disposed so as to limit or inhibit a movement of the shelf. In such embodiments, the shelf bracket has a proximal end and a distal end, the distal end being adapted for attachment in a shelving unit, the shelf has a front longitudinal edge and a rear longitudinal edge, the direction of front to rear being the same as the direction from the proximal end to the distal end, and the shelf can be disposed so that the rear longitudinal edge of the shelf is over a portion of the shelf bracket that is between a load cell body and the distal end of the shelf bracket. In such embodiments, the shelf bracket has a proximal end and a distal end, the distal end being adapted for attachment in a shelving unit, the shelf has a front longitudinal edge and a rear longitudinal edge, the direction of front to rear being the same as the direction from the proximal end to the distal end, and the shelf can be disposed so that the proximal end of the shelf bracket is under a portion of the shelf that is between the front and rear longitudinal edges of the shelf.

In some embodiments, the weighing assembly can further comprise an upright having a securing arrangement for securing said shelf bracket thereto; in some embodiments, the weighing assembly of any preceding claim, wherein the shelf bracket includes at least one bracket hook or fastener. In such embodiments, the securing arrangement of said upright can be adapted to receive said at least one bracket hook or fastener.

In some embodiments, the weighing assembly can further comprise a back panel of a shelving unit, wherein the shelf bracket further includes a stabilization member secured to, or against, said back panel. The weighing assembly can additionally comprise a connecting element passing through the back panel so as to join the stabilization member to a bracket-stabilization element disposed on an opposite side of the back panel. The bracket-stabilization element disposed on the opposite side of the back panel can comprise a corresponding receptacle for receiving the connecting element passing through the back panel. The bracket-stabilization element disposed on the opposite side of the back panel can be a respective stabilization member of another shelf bracket.

In some embodiments, the weighing assembly can comprise a or said shelf, an or said upright, and a or said back panel, so as to form a portion of a or said shelving unit, such that a volume of space above the shelf is unenclosed by walls on at least two sides. The volume of space above the shelf can be unenclosed by walls on three sides.

In some embodiments, the shelving unit can include a second weighing assembly, and can either include a second upright or be concatenated with at least a second shelving unit that includes a second upright. The weighing assembly can be adapted to support a first end of the shelf and be secured to the upright, the second weighing assembly being adapted to support the second end of the shelf and be secured to the second upright.

In some embodiments, the load cell assembly can comprise a planar load cell. In some embodiments, the load cell assembly can comprise a double ended load cell. In some embodiments, the load cell assembly comprises a load cell having a flexural member. The flexural member can be an integral portion of the load cell body.

In some embodiments, said strain-sensing gage can be associated with a processing unit configured to receive strain signals therefrom, and to produce a weight indication based on said strain signals. The weighing assembly can additionally comprise a communications arrangement for sending information about the weight indication to a computing device. The weighing assembly can additionally comprise the computing device, and the computing device can include a software module for determining, based on the information, that a product has been added to or removed from a shelf. The product can be a member of a group of products characterized by a plurality of SKU-identifiers, and the determining by the software module can additionally include determining the SKU-identifier of the product that has been added or removed from the shelf. The result of the determining by the software module can be further used to perform at least one of a retail sales transaction and an inventory adjustment in a computerized inventory system.

In embodiments, a weighing assembly that includes a shelf bracket comprises (a) a planar load cell assembly comprising at least one load cell arrangement disposed on a metal load cell body, said load cell body having a primary axis, a central longitudinal axis, and a transverse axis disposed transversely with respect to said primary and central longitudinal axes, a broad dimension of said load cell body being disposed along said primary axis, said load cell body having rectangular faces, each said load cell arrangement including (i) a first contiguous cutout window passing through said broad dimension and formed by a first pair of cutout lines disposed parallel to said central longitudinal axis, and connected by a first cutout base; (ii) a second contiguous cutout window passing through said broad dimension and formed by a second pair of cutout lines disposed parallel to said central longitudinal axis, and connected by a second cutout base; and (iii) a third contiguous cutout window passing through said broad dimension and formed by a third pair of cutout lines disposed parallel to said central longitudinal axis, and connected by a third cutout base, wherein said second contiguous cutout window is transversely bounded by said first contiguous cutout window, and said third contiguous cutout window is transversely bounded by said second contiguous cutout window, and wherein said second cutout base is disposed diametrically opposite both said first cutout base and said third cutout base. Each said load cell arrangement additionally includes (iv) a pair of measuring beams, disposed along opposite edges of said load cell body, and parallel to said central longitudinal axis, each of said measuring beams longitudinally defined by a respective cutout line of said first pair of cutout lines; (v) a first flexure arrangement having a first pair of flexure beams, disposed along opposite sides of said central longitudinal axis, and parallel thereto, said first pair of flexure beams longitudinally disposed between said first pair of cutout lines and said second pair of cutout lines, and mechanically connected by a first flexure base; (vi) a second flexure arrangement having a second pair of flexure beams, disposed along opposite sides of said central longitudinal axis, and parallel thereto, said second pair of flexure beams longitudinally disposed between said second pair of cutout lines and said third pair of cutout lines, and mechanically connected by a second flexure base; (vii) a loading element, longitudinally defined by said third pair of cutout lines, and extending from said second flexure base, said transverse axis passing through said loading element; and (viii) at least one strain gage, fixedly attached to a surface of a measuring beam of said measuring beams. The weighing assembly that includes a shelf bracket additionally comprises a load cell base including the shelf bracket, said load cell base attached to said load cell body at an anchored end thereof.

In some embodiments, the weighing assembly can additionally comprise a receiving bracket adapted to receive a shelf. The weighing assembly can additionally comprise at least one protruding element, wherein, in an assembled configuration, the at least one protruding element is disposed on said receiving bracket and vertically aligned with said at least one receiving element. In some embodiments, the weighing assembly can additionally comprise at least one protruding element, wherein, in an assembled configuration, the at least one protruding element is disposed on said receiving element and vertically aligned with said at least one protruding-element receptacle in said receiving bracket. In some embodiments, the weighing assembly can additionally comprise a shelf, wherein, in said assembled configuration, the shelf is disposed atop the receiving bracket such that said receiving bracket bears an entire weight of the shelf. The receiving bracket can include an elongated horizontal member and a plurality of vertical members, at least some of the plurality of vertical members being disposed so as to limit or inhibit a movement of the shelf. In some embodiments, the shelf bracket has a proximal end and a distal end, the distal end being adapted for attachment in a shelving unit, the shelf has a front longitudinal edge and a rear longitudinal edge, the direction of front to rear being the same as the direction from the proximal end to the distal end, and the shelf can be disposed so that the proximal end of the shelf bracket is under a portion of the shelf that is between the front and rear longitudinal edges of the shelf.

In some embodiments, the weighing assembly can further comprise an upright having a securing arrangement for securing said shelf bracket thereto. The shelf bracket can include at least one bracket hook and the securing arrangement of said upright is adapted to receive said at least one bracket hook.

In some embodiments, the weighing assembly can further comprise a back panel of a shelving unit, wherein the shelf bracket further includes a stabilization member secured to, or against, said back panel, and a connecting element passing through the back panel so as to join the stabilization member to a bracket-stabilization element disposed on an opposite side of the back panel.

In some embodiments, the volume of space above the shelf can be unenclosed by walls on three sides.

In some embodiments, the shelving unit can include a second weighing assembly, and can either include a second upright or be concatenated with at least a second shelving unit that includes a second upright. The weighing assembly can be adapted to support a first end of the shelf and be secured to the upright, with the second weighing assembly being adapted to support the second end of the shelf and be secured to the second upright.

In some embodiments, the load cell assembly can comprise a double ended load cell.

In some embodiments, said strain-sensing gage can be associated with a processing unit configured to receive strain signals therefrom, and to produce a weight indication based on said strain signals. The weighing assembly can additionally comprise a communications arrangement for sending information about the weight indication to a computing device.

In embodiments, a shelving arrangement having at least one load cell assembly comprises (a) a shelving unit including a back panel and at least one upright associated with said back panel; and (b) at least one load cell assembly, each load cell assembly including (i) a load cell body having a free end and an anchored portion, said load body including a spring element and at least one receiving element adapted, in an operative mode, to receive a vertical load, said receiving element having an unloaded disposition and a loaded disposition in which said free end is depressed with respect to said free end in said unloaded disposition, and (ii) at least one strain-sensing gage, bonded to said spring element, said strain-sensing gage adapted to measure a strain in said spring element, in said loaded disposition. The shelving arrangement having at least one load cell assembly also comprises a load cell base including a shelf bracket, said load cell base attached to said load cell body at an anchored end thereof, the shelf bracket including at least one attachment member. Said upright has a securing arrangement for securing the shelf bracket thereto said at least one attachment member, and the shelf bracket includes a stabilization member secured to, or against, the back panel of a shelving unit by being joined, using a connecting element passing through the back panel, to a bracket-stabilization element disposed on a second side of the back panel.

In some embodiments, the shelving arrangement can additionally comprise a receiving bracket adapted to receive a shelf. The shelving arrangement can additionally comprise at least one protruding element protruding element disposed on said receiving bracket and vertically aligned with said at least one receiving element. The shelving arrangement can additionally comprise at least one protruding element disposed on said receiving element and vertically aligned with said at least one protruding-element receptacle in said receiving bracket. The shelving arrangement can additionally comprise a shelf, wherein, in an assembled configuration, the shelf is disposed atop the receiving bracket such that said receiving bracket bears an entire weight of the shelf. The receiving bracket can include an elongated horizontal member and a plurality of vertical members, at least some of the plurality of vertical members being disposed so as to limit or inhibit a movement of the shelf.

In some embodiments, the load cell assembly can comprise a double ended load cell.

In some embodiments, said strain-sensing gage can be associated with a processing unit configured to receive strain signals therefrom, and to produce a weight indication based on said strain signals. The shelving arrangement can additionally comprise a communications arrangement for sending information about the weight indication to a computing device.

In embodiments, a weighing assembly including a shelf bracket comprises a receiving bracket adapted to receive a shelf, and a load cell assembly including (i) a load cell body having a free end and an anchored portion, said load body including a spring element and at least one receiving element adapted to receive a vertical load from said receiving bracket, said receiving element having an unloaded disposition and a loaded disposition in which said free end is depressed with respect to said free end in said unloaded disposition; and (ii) a strain-sensing gage, bonded to said spring element, said strain-sensing gage adapted to measure a strain in said spring element, in said loaded disposition. The weighing assembly including a shelf bracket also comprises a load cell base including the shelf bracket, said load cell base attached to said load cell body at said anchored portion thereof.

In embodiments, a method is disclosed for of tracking inventory of products displayed on shelving comprising weighing assemblies, the method comprising (a) storing products characterized by a plurality of SKU-identifiers on a shelf comprising a weighing assembly, the weighing assembly comprising a load cell assembly including (i) a planar load cell body having a free end and an anchored portion, the load cell body including a spring element and at least one receiving element, (ii) a strain-sensing gage, bonded to said spring element, said strain-sensing gage adapted to measure a strain in said spring element, in said loaded disposition, and (iii) a load cell base including the shelf bracket; (b) tracking the weight of the products on the shelf, using the load cell assembly; (c) in response to a change in weight of the products on the shelf, sending information about the weight of the products from the load cell assembly to a computing device; and (d) in response to receiving the information about the weight of the products, (i) determining, by the computing device, that a product has been added to or removed from the shelf, and (ii) in response to the determining that a product has been added to or removed from the shelf, further determining an SKU-identifier of the product added or removed.

In some embodiments, the method can additionally comprise the step of recording a change in an inventory management system. In some embodiments, the method can additionally comprise the step of completing a retail sales transaction, using the result of the determining and of the further determining.

In some embodiments, the first and second load cell assemblies include, or consist of, planar load cell assemblies as described herein.

A method is disclosed, according to embodiments, for tracking inventory of products displayed on a shelf. The method comprises: (a) tracking weight of products stored on the shelf, the products characterized by a plurality of SKU-identifiers, the shelf comprising a plurality of weighing assemblies, each weighing assembly comprising (i) a respective shelf bracket, and (ii) a respective load cell assembly fixedly attached to a horizontal member of said respective shelf bracket so as to mediate between the horizontal member and said shelf, said respective load cell assembly comprising: (A) a load cell body having a free end and an anchored portion, said load cell body including a spring element and at least one receiving element, and (B) a strain-sensing gage, bonded to said spring element, said strain-sensing gage adapted to measure a strain in said spring element, wherein said load cell base is attached to said load cell body at said anchored portion thereof; (b) in response to a change in weight of the products on the shelf, sending information about the weight of the products from at least one weighing assembly of said plurality of weighing assemblies to a computing device; and (c) in response to receiving the information about the weight of the products: (i) determining, by the computing device, that a product has been added to or removed from the shelf, and (ii) in response to the determining that a product has been added to or removed from the shelf, further determining an SKU-identifier of the product added or removed.

In some embodiments, the method can additionally comprise the step of recording a change in an inventory management system.

In some embodiments, the method can additionally comprise the step of completing a retail sales transaction, using the result of the determining and of the further determining.

A method is disclosed herein for tracking non-homogeneous products on a shelf by using a plurality of weighing assemblies that are jointly operable to measure the combined weight of the shelf and of the products arranged thereupon, wherein the method comprises: (a) monitoring weight measurement data corresponding to the weight of the shelf and the products arranged thereupon, said weight measurement data measured by the plurality of weighing assemblies and transmitted therefrom as respective streams of weight measurement data points; (b) responsively to a change over time in the values of said weight measurement data, determining a set of weight-event parameters of a weight event, the set of weight-event parameters comprising a product identification and an action taken with respect to the product, the determining comprising: (i) aggregating, across all of the streams, changes in said weight measurement data corresponding to a specific time, (ii) mapping a change in weight distribution on the shelf, using the aggregated changes in weight measurement data, and (iii) assigning a set of weight-event parameters for resolving the mapped change in weight distribution, using product-weight data retrieved from a product database; and (c) performing at least one of: (i) recording information about the results of the selecting in a non-transient, computer-readable medium, and (ii) displaying information about the results of the selecting on a display device.

In some embodiments, each of the weighing assemblies comprises: (a) at least one load cell arrangement disposed on a single metal load cell body, said load cell body having a primary axis, a central longitudinal axis, and a transverse axis disposed transversely with respect to said primary and central longitudinal axes, a broad dimension of said load cell body being disposed perpendicular to said primary axis, each said load cell arrangement including: (i) a first contiguous cutout window passing through said broad dimension and formed by a first pair of cutout lines disposed generally parallel to said central longitudinal axis, and connected by a first cutout base; (ii) a second contiguous cutout window passing through said broad dimension and formed by a second pair of cutout lines disposed generally parallel to said central longitudinal axis, and connected by a second cutout base, wherein said second contiguous cutout window is transversely bounded by said first contiguous cutout window; (iii) a pair of measuring beams disposed along opposite edges of said load cell body and generally parallel to said central longitudinal axis, each of said measuring beams longitudinally defined by a respective cutout line of said first pair of cutout lines; (iv) a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base; (v) a loading element, longitudinally defined by an innermost pair of cutout lines, comprising a receiving element and extending from an innermost flexure base, said transverse axis passing through said loading element; and (vi) at least one strain gage, fixedly attached to a surface of a measuring beam of said measuring beams.

In some embodiments, said assigning comprises: (i) identifying at least one candidate set of weight-event parameters for resolving the mapped change in weight distribution, using product-weight data retrieved from a product database, (ii) assigning an event likeliness score to each candidate set of weight-event parameters, and (iii) selecting the set of candidate weight-event parameters having the highest event likeliness score.

In some embodiments, the determining can use product positioning data from a product positioning plan in at least the identifying.

In some embodiments, the determining can include calculating a probability in at least the assigning. In some such embodiments, the probability can be calculated using a probability distribution function. In some such embodiments, a parameter of the probability distribution function can be derived using a machine learning algorithm applied to historical weight data for a product.

In some embodiments, the assigned set of weight-event parameters includes exactly one product and one action.

In some embodiments, the assigned set of weight-event parameters can include at least one of (i) two or more products and (ii) two or more actions.

In some embodiments, said action taken with respect to the product is selected from the group consisting of removing the product from the shelf, adding the product to the shelf, and moving the product from one position on the shelf to another.

According to embodiments of the present invention, a weighing assembly for weighing a shelf comprises: (a) a shelf bracket comprising a horizontal member configured to support the shelf in an x-z plane that is parallel to a floor, and a first vertical member in a y-z plane orthogonal to the x-z plane, and (b) a load cell assembly fixedly attached to the horizontal member so as to mediate between the horizontal member and the shelf, the load cell assembly comprising: (i) a load cell body having a free end and an anchored portion, said load cell body including a spring element and at least one receiving element, and (ii) a strain-sensing gage, bonded to said spring element, said strain-sensing gage adapted to measure a strain in said spring element, wherein, in an assembled configuration, (i) said load cell body is attached to said horizontal member at said anchored portion of the load cell body, and (ii) said at least one receiving element is adapted to receive a vertical load from the shelf, said receiving element has (A) an unloaded disposition, and (B) a loaded disposition in which said at least one receiving element receives said vertical load, wherein in said loaded disposition, said free end attains a depressed position with respect to said free end in said unloaded disposition.

In some embodiments, (i) said load cell body can have a primary axis, a central longitudinal axis, and a transverse axis disposed transversely with respect to said primary and central longitudinal axes, a broad dimension of said load cell body being disposed perpendicular to said primary axis, and/or (ii) said load cell body includes: (A) a first contiguous cutout window passing through said broad dimension and formed by a first pair of cutout lines disposed generally parallel to said central longitudinal axis, and connected by a first cutout base, (B) a second contiguous cutout window passing through said broad dimension and formed by a second pair of cutout lines disposed generally parallel to said central longitudinal axis, and connected by a second cutout base, said second contiguous cutout window being transversely bounded by said first contiguous cutout window, (C) a pair of measuring beams disposed along opposite edges of said load cell body and generally parallel to said central longitudinal axis, each of said measuring beams longitudinally defined by a respective cutout line of said first pair of cutout lines, (D) a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base, and/or (E) a loading element, longitudinally defined by an innermost pair of cutout lines, comprising a receiving element and extending from an innermost flexure base, said transverse axis passing through said loading element.

In embodiments, the primary axis, central longitudinal axis, and transverse axis, as well as the broad dimension of said load cell body, can be on, or parallel to, said x-z axis. In some embodiments, said load cell body can additionally include: (F) a third contiguous cutout window passing through said broad dimension and formed by a third pair of cutout lines disposed parallel to said central longitudinal axis, and connected by a third cutout base, and/or (G) a second flexure arrangement having a second pair of flexure beams, disposed along opposite sides of said central longitudinal axis, and parallel thereto, said second pair of flexure beams longitudinally disposed between said second pair of cutout lines and said third pair of cutout lines, and mechanically connected by a second flexure base, wherein said loading element is longitudinally defined by said third pair of cutout lines, and extending from said second flexure base.

In some embodiments, said load cell assembly can comprise a double ended load cell.

In some embodiments, said at least one strain-sensing gage can be associated with a processing unit configured to receive strain signals therefrom, and to produce a weight indication based on said strain signals.

According to embodiments, a shelving arrangement can comprise (a) a back panel; (b) first and second uprights associated with said back panel; (c) first and second weighing assemblies according to any of the embodiments disclosed hereinabove, adapted for being removably mounted to respective said first and second uprights, wherein (i) each of the weighing assemblies comprises a respective second vertical member in an x-y plane that is parallel to the back panel and orthogonal to both the x-z plane and the y-z plane, and (ii) the first and second weighing assemblies are mirror images of each other relative to respective said first vertical members; and/or a shelf disposed to be in at least indirect contact with both respective load cell assemblies of said first and second weighing assemblies.

In some embodiments, the shelving arrangement can additionally comprise first and second connecting elements passing through the back panel so as to join respective said vertical members to corresponding bracket-stabilization elements disposed on a reverse side of the back panel. In some such embodiments, the bracket-stabilization element can be disposed on the opposite side of the back panel is a respective stabilization member of another shelf bracket.

In some embodiments, the shelving arrangement of claim 6 can comprise a communications arrangement for sending information about the weight indication to a computing device. In some such embodiments, the shelving arrangement can additionally comprise the computing device, wherein the computing device includes a software module for determining, based on the information, that a product has been added to or removed from a shelf. In some such embodiments, the product cam be a member of a group of products characterized by a plurality of SKU-identifiers, and the determining by the software module additionally includes determining the SKU-identifier of the product that has been added or removed from the shelf. In some such embodiments, the result of the determining by the software module can be further used to perform at least one of a retail sales transaction and an inventory adjustment in a computerized inventory system.

According to embodiments, a weighing-assembly unit can comprise: (a) first and second weighing assemblies according to any of the embodiments disclosed hereinabove; and/or (b) a shelf frame or at least one beam member joining respective said shelf brackets of said first and second weighing assemblies so as to form, in combination therewith, a rigid shelf frame.

In some embodiments, the weighing-assembly unit can additionally comprise a shelf installed upon an upward-facing surface of said rigid shelf frame, the shelf disposed to be in at least indirect contact with said respective load cell assemblies of said first and second weighing assemblies.

According to embodiments, a shelving arrangement can comprise: (a) a back panel; (b) a first and second uprights associated with said back panel; and/or (c) the weighing-assembly unit.

A method is disclosed, according to embodiments, for tracking inventory of products on a shelf. The method comprises: (a) tracking weight of products stored on the shelf, the products characterized by a plurality of SKU-identifiers, the shelf comprising a plurality of weighing assemblies, each weighing assembly comprising (i) a respective shelf bracket, and (ii) a respective load cell assembly fixedly attached to a horizontal member of said respective shelf bracket so as to mediate between the horizontal member and said shelf, said respective load cell assembly comprising: (A) a load cell body having a free end and an anchored portion, said load cell body including a spring element and at least one receiving element, and (B) a strain-sensing gage, bonded to said spring element, said strain-sensing gage adapted to measure a strain in said spring element, wherein said load cell base is attached to said load cell body at said anchored portion thereof; (b) in response to a change in weight of the products on the shelf, sending information about the weight of the products from at least one weighing assembly of said plurality of weighing assemblies to a computing device; and (c) in response to receiving the information about the weight of the products: (i) determining, by the computing device, that a product has been added to or removed from the shelf, and (ii) in response to the determining that a product has been added to or removed from the shelf, further determining an SKU-identifier of the product added or removed.

A method is disclosed, according to embodiments, for tracking inventory of products on a shelf. The method comprises: (a) tracking weight of non-homogeneous products stored on the shelf, the shelf comprising a plurality of weighing assemblies, each weighing assembly comprising (i) a respective shelf bracket, and (ii) a respective load cell assembly fixedly attached to a horizontal member of said respective shelf bracket so as to mediate between the horizontal member and said shelf, said respective load cell assembly comprising: (A) a load cell body having a free end and an anchored portion, said load cell body including a spring element and at least one receiving element, and (B) a strain-sensing gage, bonded to said spring element, said strain-sensing gage adapted to measure a strain in said spring element, wherein said load cell base is attached to said load cell body at said anchored portion thereof; (b) in response to a change in weight of the products on the shelf, sending information about the weight of the products from at least one weighing assembly of said plurality of weighing assemblies to a computing device; and (c) in response to receiving the information about the weight of the products: (i) determining, by the computing device, that a product has been added to or removed from the shelf, and (ii) in response to the determining that a product has been added to or removed from the shelf, identifying the product added or removed.

In some embodiments, it can be that the products are characterized by a plurality of SKU-identifiers, and/or that the identifying includes determining an SKU-identifier.

In some embodiments, the method can additionally comprise the step of recording a change in an inventory management system.

In some embodiments, the method can additionally comprise the step of completing a retail sales transaction, using the result of the determining and of the further determining.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 12A, 12B and 12C are additional views of the assembled weighing assembly including a receiving bracket of FIG. 11B, respectively two elevation views ('side' and 'front'), and a top view;

DETAILED DESCRIPTION OF THE ILLUSTRATED EMBODIMENTS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements. Subscripted reference numbers (e.g., $10_1$) or letter-modified reference numbers (e.g., $100a$) are used to designate multiple separate appearances of elements in a single drawing, e.g. $10_1$ is a single appearance (out of a plurality of appearances) of element 10, and $100a$ is a single appearance (out of a plurality of appearances) of element 100.

As used herein, the term "SKU" means stock-keeping unit. The use of SKU-identifiers is a standard means of identifying unique products across industries. Unique products can be, for example, products defined by unique combinations of physical characteristics, e.g., weight (whether nominal or average), volume, dimensions, etc. and/or non-physical characteristics, e.g., brand or packaging design. It can be that two products can be similar in physical characteristics but have different SKU-identifiers; in some embodiments they can be considered as 'non-homogeneous' and in other embodiments they may not. In an example, a particular brand of cookies may offer products with a number of different SKU-identifiers: a first SKU for the brand's large package of large chocolate cookies, a second SKU for the brand's small package of the same large chocolate cookies, and a third SKU for the brand's large package of small chocolate cookies, and so on. The term "non-homogeneous", as applied herein to a group of products, means that the products in the group do not all share the same SKU-identifier, but should not be understood to imply that each product in a group has a unique SKU-identifier. For example, a group of non-homogeneous products might include: (a) 10 large packages of large chocolate cookies bearing a first brand and having a first SKU-identifier, and (b) 2 large packages of small chocolate cookies from a second brand and having a second SKU-identifier, or, without limitation any combination of products having, in combination, two or more SKU-identifiers. A group of products having, in combination, two or more SKU-identifiers can be considered 'non-homogeneous' with respect to one another.

Figure 1:
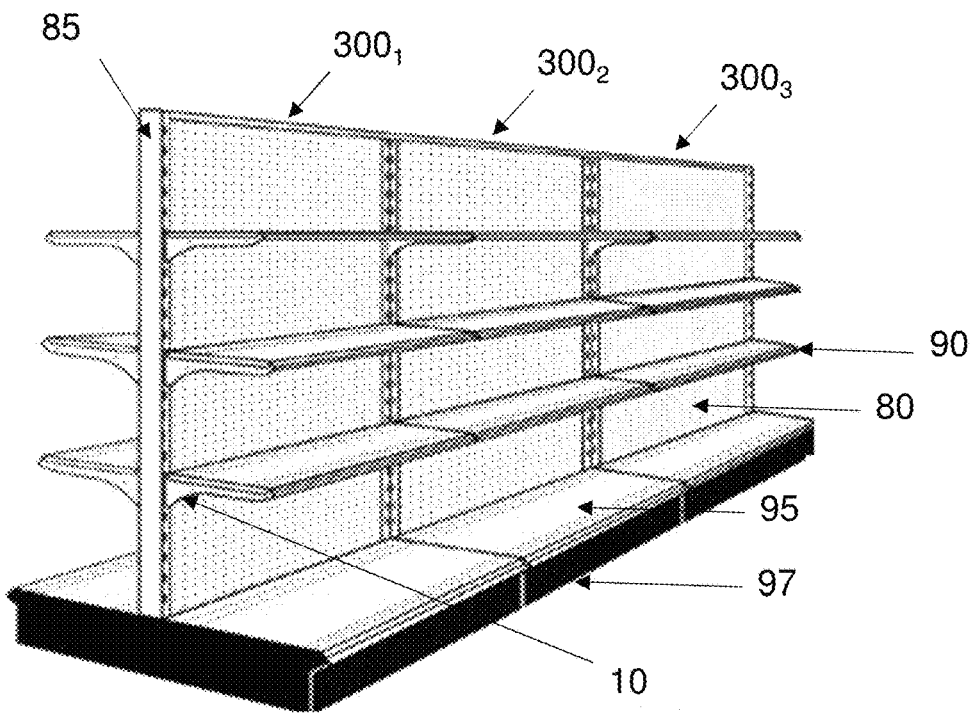
FIG. 1 is a perspective view of a double-sided gondola-type shelving arrangement comprising three shelving units, according to embodiments.

Referring now to FIG. 1, a concatenated assembly of three gondola-type shelving units 300 ($300_1$, $300_2$, $300_3$) is illustrated. This is a familiar type of shelving unit common in supermarkets and other retail stores. Each shelving unit 300 (also called a shelving bay) comprises an upright 85, usually a back panel 80, and one or more shelves 90. According to the embodiment illustrated in FIG. 1, each shelf is supported by a weighing assembly 10, which includes a shelf bracket (detail not shown in FIG. 1). The weighing assembly 10 is equipped with weight-measuring devices (not shown in FIG. 1) that allow the measuring of the weight of the shelf 90 and of any products placed thereupon once the shelving unit is deployed in a retail or inventory storage environment. A shelving unit 300 can also include a base shelf 95 mounted on a base unit 97. Although not shown in FIG. 1, a base-unit weighing assembly can also be interposed between the base unit 97 and the base shelf 95 so as to have the same weighing function as do the 'hanging' shelves 90 and their respective weighing assemblies 10.

Figure 2:
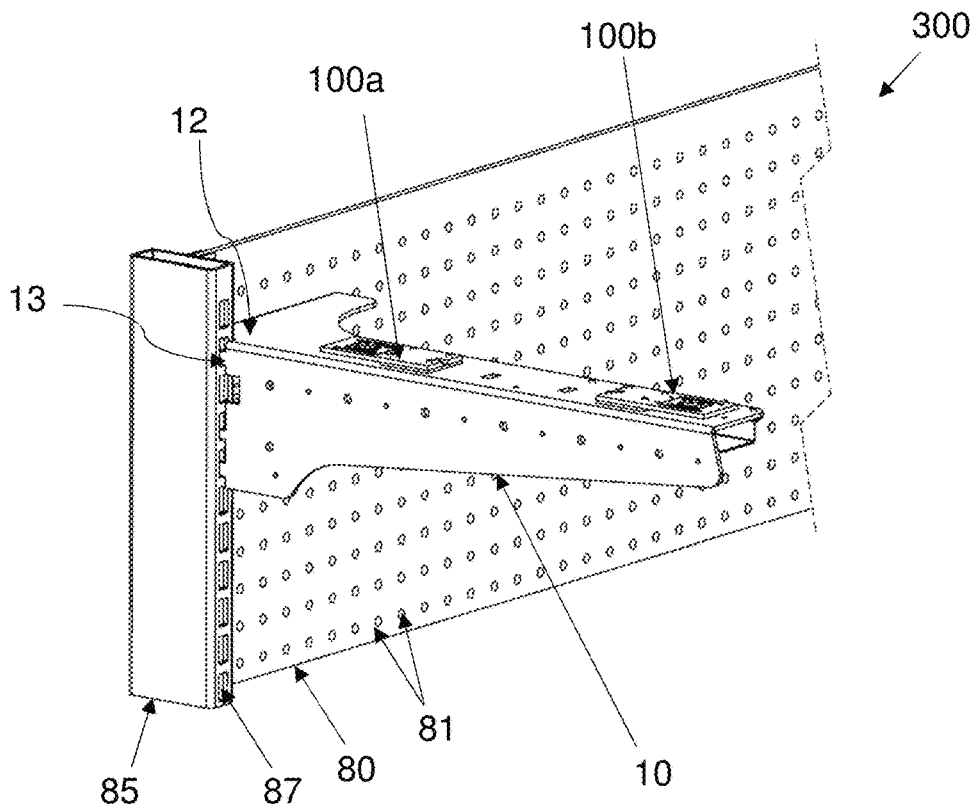
FIGS. 2 and 3A are respectively assembled and exploded perspective views of a weighing assembly attached to an upright of a gondola-type shelving unit also comprising a back panel, according to embodiments.

FIG. 2 provides a closer view (in perspective) of a weighing assembly 10 according to various embodiments—shown in FIG. 2 without the shelf (e.g., shelf 90) which it supports. The weighing assembly 10 is attached to an upright 85 of a gondola-type shelving unit 300 (only portions of one upright 85 and the back panel 80 are shown in FIG. 2). The weighing assembly 10 includes a shelf bracket 12 and two load cell assemblies 100a, 100b. In other embodiments, not shown here, a weighing assembly can include more load cell assemblies or fewer, i.e., one. The attachment of the weighing assembly, i.e., of the shelf bracket 120 portion of weighing assembly 10, is by industry-standard bracket hooks 13 engaging in bracket holes 87 of the upright 85. There are various known industry-standard types of uprights and respective matching shelf bracket attachments and the specific choice of bracket hook or other bracket attachment design is not important. Similarly, the back panel 80 of the shelving unit 300 is shown as having holes 81 (like a 'peg board') merely because this is a common type of back panel used in industry. In other embodiments, the back panel can be solid, or slatted, or any other design.

Figure 3A:
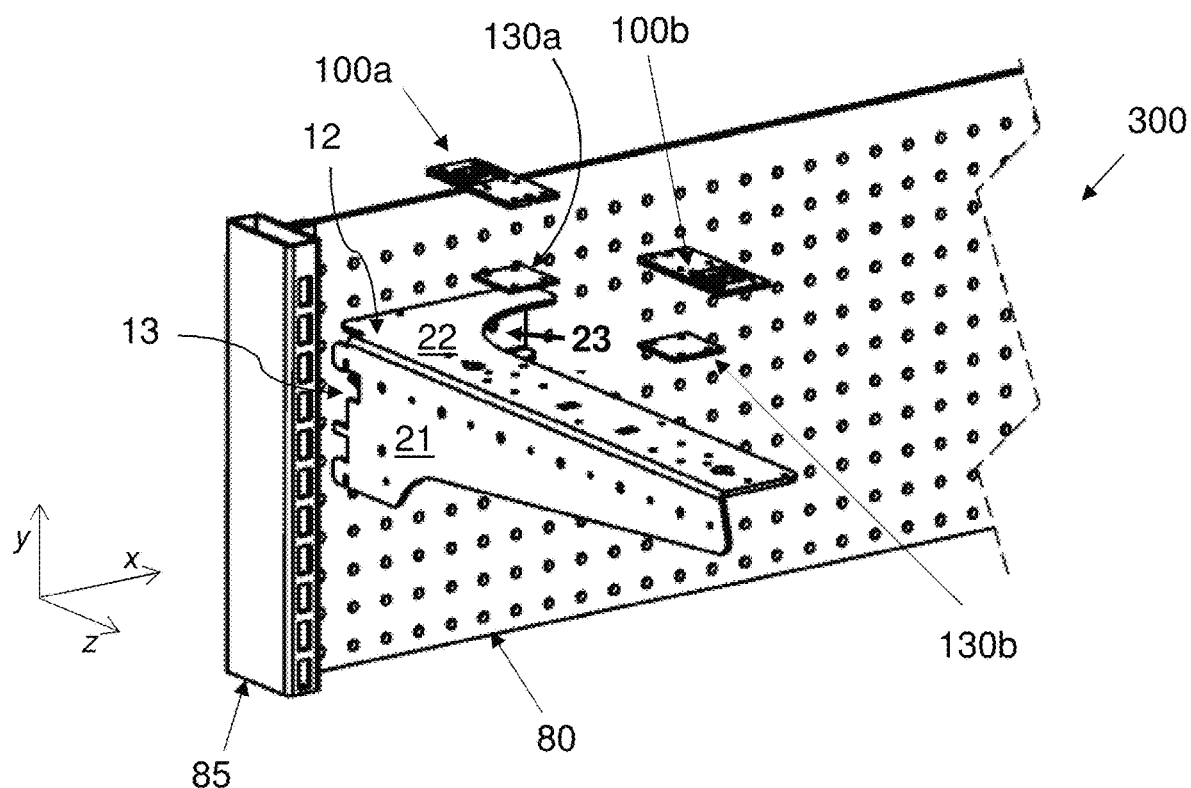

The weighing assembly 10 of FIGS. 2 and 3A is clearly designed to support the 'left' side or end of a shelf, i.e., 'left' from the perspective of one looking at the weighing assembly 10 with the back panel of the shelving unit 300 in the background. It will be obvious to one skilled in the art that a mirror-image weighing assembly will be necessary for supporting the 'right' end of the same shelf. In other words, weighing assemblies in embodiments describing ordinary implementation are provided in pairs of left and right weighing assemblies.

Figure 3B:
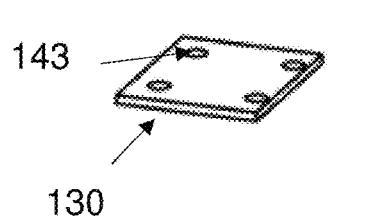
FIGS. 3B and 3C are respective close-up views of two elements of the weighing assembly of FIGS. 2 and 3A.
Figure 3C:
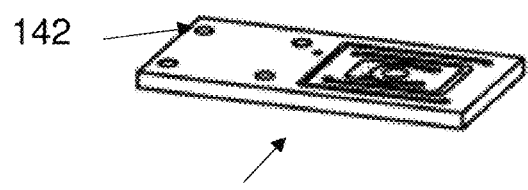

The installation of the planar load cells 100 in the weighing assembly 10 involves anchoring them on a 'base' which, according to embodiments, can include a shelf bracket 12 and/or a shim (adapter plate) 130. Referring now to FIGS. 3A, 3B and 3C, mounting holes 142 are provided in load cell assembly 100, which line up with similarly-spaced shim holes 143. Thus, load cell assemblies 100A, 100B can be attached (by screw or rivet or any other appropriate attaching method) to a respective shim 130A, 130B and, in this way, complete the installation of the load cell assemblies on the 'base'.

Discussion of Load Cell Assembly Embodiments

Load cells with low profiles may have a characteristically low amplitude signal. Given limitations in the total weight to be measured, and the inherent sensitivity of load cells, the performance of such devices may be compromised by a high noise-to-signal ratio and by unacceptable settling times. Various embodiments of the present invention resolve, or at least appreciably reduce, parasitic noise issues associated with typical low-profile load cells and enable high accuracy weight measurements.

Loading of a spring arrangement is effected by placing a load on, or below, a loading beam, depending on whether the loading beam is anchored to the weighing platform, or to the weighing base. The loading beam may also be referred to as the "loading element" or as the "load-receiving element" or "load-supporting element" (depending on the configuration) of the load cell assembly. The spring arrangement has at least one flexure arrangement having at least two flexures or flexural elements operatively connected in series. The flexure arrangement is operatively connected, at a first end, to the loading beam, and at a second end, to the free or adaptive end of at least one measuring beam.

The flexure arrangement has n flexures (n being an integer) operatively connected in series, the first of these flexures being operatively connected to the loading beam, and the ultimate flexure of the n flexures being operatively connected in series to a second flexure, which in turn, is operatively connected to the first flexure in an assembly of m flexures (m being an integer), operatively connected in series. The ultimate flexure of the m flexures is operatively connected, in series, to a measuring beam of the spring arrangement. Associated with the measuring beam is at least one strain gage, which produces weighing information with respect to the load.

The inventor has discovered that at least two of such flexure arrangements, disposed generally in parallel, may be necessary for the loading element to be suitably disposed substantially in a horizontal position (i.e., perpendicular to the load). In some embodiments, and particularly when extremely high accuracy is not necessary, a single flexure disposed between the loading beam and the measuring beam may be sufficient. This single flexure load cell arrangement may also exhibit increased crosstalk with other load cell arrangements (weighing assemblies may typically have 4 of such load cell arrangements for a single weighing platform). For a given nominal capacity, the overload capacity may also be compromised with respect to load cell arrangements having a plurality of flexures disposed in series between the load receiving beam and the measuring beam. This reduced overload capacity may be manifested as poorer durability and/or shorter product lifetime, with respect to load cell arrangements having a plurality of flexures disposed in series. Nonetheless, the overall performance of the single-flexure arrangement may compare favorably with conventional weighing apparatus and load cell arrangements. In any event, for this case, m+n=-1, which is the lowest value of m+n flexures for the present invention.

Moreover, there may be two or more spring arrangements for each loading element, disposed generally in parallel. Typically, and as described hereinbelow with respect to FIGS. 4A and 4B, the spring arrangement may include pairs of coupled flexures and coupled measuring beams.

Typically, there are 4 strain gages per loading beam. The strain gages may be configured in a Wheatstone bridge configuration, a configuration that is well known to those of skill in the art. The load cell system may further include a processing unit, such as a central processing unit (CPU). The processing unit may be configured to receive the load or strain signals (e.g., from 4 strain gages SG1-SG4) from each particular load cell and to produce a weight indication based on the load signals, as is known to those of ordinary skill in the art.

Figures 4A, 4B:
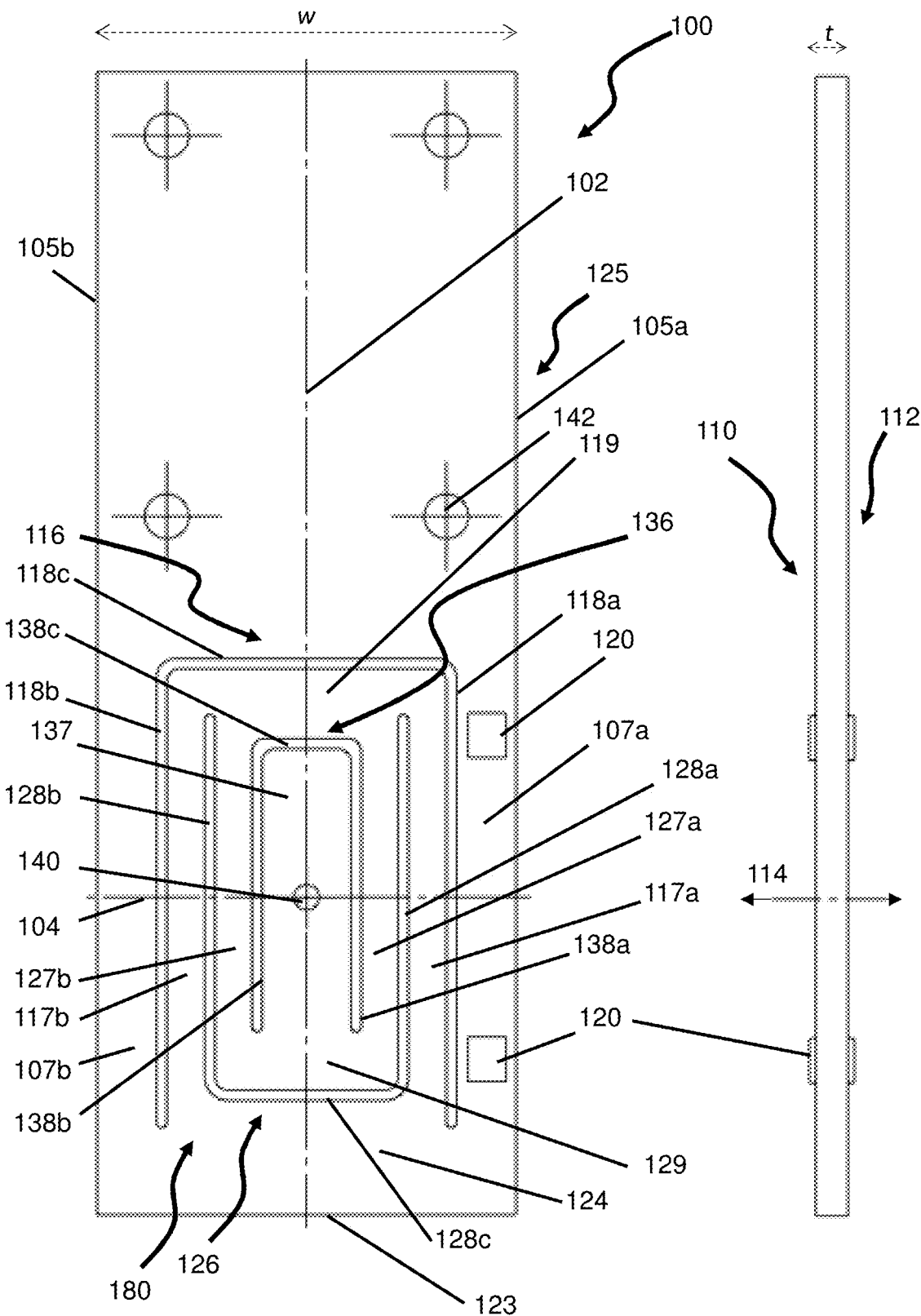
FIGS. 4A and 4B are respectively top and side schematic views of a planar load cell assembly 100, according to an embodiment of the present invention.

Referring collectively to FIGS. 4A and 4B, a load cell body 125 may be made from a block of load cell quality metal or alloy. Particularly advantageous embodiments employing particular magnesium alloys will be described hereinbelow.

Load cell body 125 may be fixed to a weighing assembly via one or more mounting holes or elements 142. A $1^{st}$ contiguous cutout window 116 passes from a top face 110 through a bottom face 112, perpendicularly through the broad dimension (i.e., with respect to the other 2 dimensions of a three-dimensional Cartesian system) of load cell body 125. $1^{st}$ contiguous cutout window 116 may be generally C-shaped or U-shaped, and may have arms or a pair of cutout lines 118a, 118b running generally parallel to a central longitudinal axis 102 of load cell body 125, and connected or made contiguous by a cutout line or cutout base 118c. Both central longitudinal axis 102 and a transverse axis 104, disposed transversely thereto, run generally parallel to the broad dimension of load cell body 125. Both of these axes are oriented in perpendicular fashion with respect to a primary axis 114. The thickness of load cell body 125 perpendicular to primary axis 114 is typically within a range of 2 mm to 10 mm, and is designated $W_{LCB}$.

Long sides 105a and 105b of load cell body 125 run generally along, or parallel to, central longitudinal axis 102.

As shown, measuring beams or spring elements 107a and 107b are each disposed between respective cutout lines 118a and 118b, and respective long sides 105a and 105b of load cell body 125, distal to cutout lines 118a and 118b with respect to transverse axis 104. When planar load cell assembly 100 is disposed in a vertically loaded position, the free end of each of beams 107a and 107b may be held in a fixed relationship, substantially perpendicular to the vertical load, by an end block 124 disposed at a free end 123 of load cell body 125.

A $2^{nd}$ contiguous cutout window 126 also passes from top face 110 through bottom face 112, perpendicularly through the broad dimension of load cell body 125. $2^{nd}$ contiguous cutout window 126 may be generally C-shaped or U-shaped, and may have arms or a pair of cutout lines 128a, 128b running generally parallel to central longitudinal axis 102, and connected or made contiguous by a cutout line or cutout base 128c. $2^{nd}$ contiguous cutout window 126 may be enveloped on three sides by $1^{st}$ contiguous cutout window 116 (such that the $2^{nd}$ contiguous cutout window is transversely bounded by the $1^{st}$ contiguous cutout window). The orientation of $2^{nd}$ contiguous cutout window 126 may be 180° (i.e., generally opposite) with respect to $1^{st}$ contiguous cutout window 116.

A $3^{rd}$ contiguous cutout window 136 also passes from top face 110 through bottom face 112, perpendicularly through the broad dimension of load cell body 125. $3^{rd}$ contiguous cutout window 136 may be generally C-shaped or U-shaped, and may have arms or a pair of cutout lines 138a, 138b running generally parallel to central longitudinal axis 102, and connected or made contiguous by a cutout line or cutout base 138c. $3^{rd}$ contiguous cutout window 136 may be enveloped on three sides by $2^{nd}$ contiguous cutout window 126 (such that the $3^{rd}$ contiguous cutout window is transversely bounded by the $2^{nd}$ contiguous cutout window). The orientation of $3^{rd}$ contiguous cutout window 136 may be 180° (i.e., generally opposite) with respect to $2^{nd}$ contiguous cutout window 126 (and generally aligned with $1^{st}$ contiguous cutout window 116).

Load cell body 125 has a first flexure arrangement having a first pair of flexure beams 117a, 117b disposed along opposite sides of central longitudinal axis 102, and distal and generally parallel thereto. First pair of flexure beams 117a, 117b may be longitudinally disposed between the first pair of cutout lines and the second pair of cutout lines, and mechanically connected or coupled by a first flexure base 119.

Load cell body 125 has a second flexure arrangement having a second pair of flexure beams 127a, 127b disposed along opposite sides of central longitudinal axis 102, and distal and generally parallel thereto. Second pair of flexure beams 127a, 127b may be longitudinally disposed between the first pair of cutout lines and the second pair of cutout lines, and mechanically connected or coupled by a second flexure base 129.

Contiguous cutout window 136 defines a loading element 137 disposed therein. Loading element 137 is longitudinally defined by $3^{rd}$ pair of cutout lines 138a and 138b, and is connected to, and extends from, second flexure base 129.

The various cutout lines described above may typically have a width ($W_{CO}$) of 0.2 mm to 5 mm, and more typically, 0.2 mm to 2.5 mm, 0.2 mm to 2.0 mm, 0.2 mm to 1.5 mm, 0.2 mm to 1.0 mm, 0.2 mm to 0.7 mm, 0.2 mm to 0.5 mm, 0.3 mm to 5 mm, 0.3 mm to 2.5 mm, 0.3 mm to 2.0 mm, 0.3 mm to 1.5 mm, 0.3 mm to 1.0 mm, 0.3 mm to 0.7 mm, 0.3 mm to 0.6 mm, or 0.3 mm to 0.5 mm.

In some embodiments, the ratio of $W_{CO}$ to $W_{LCB}$ ($W_{CO}/W_{LCB}$) is at most 0.5, at most 0.4, at most 0.3, at most 0.25, at most 0.2, at most 0.15, at most 0.12, at most 0.10, at most 0.08, at most 0.06, or at most 0.05.

Figure 11A:
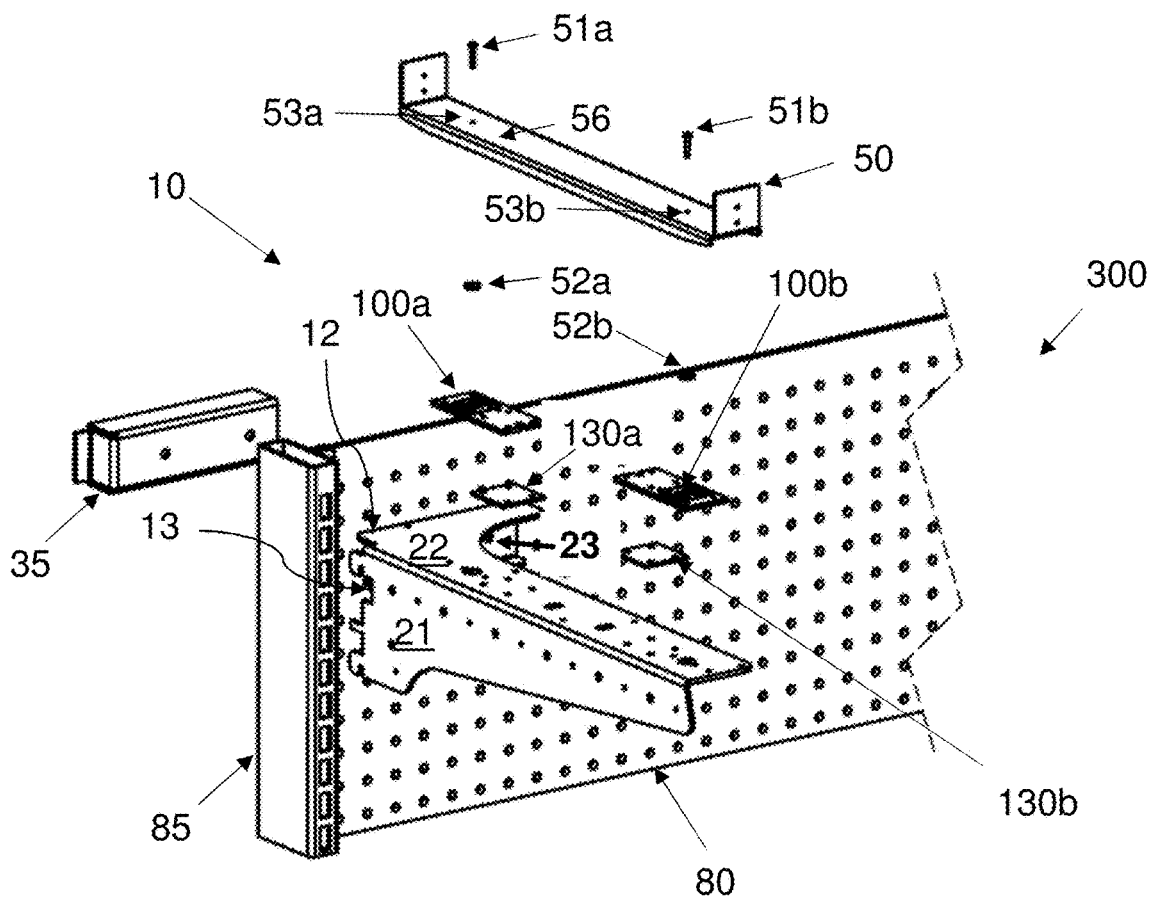
FIGS. 11A and 11B are respectively exploded and assembled perspective views of a weighing assembly including a receiving bracket for a shelf, according to embodiments.
Figure 11B:
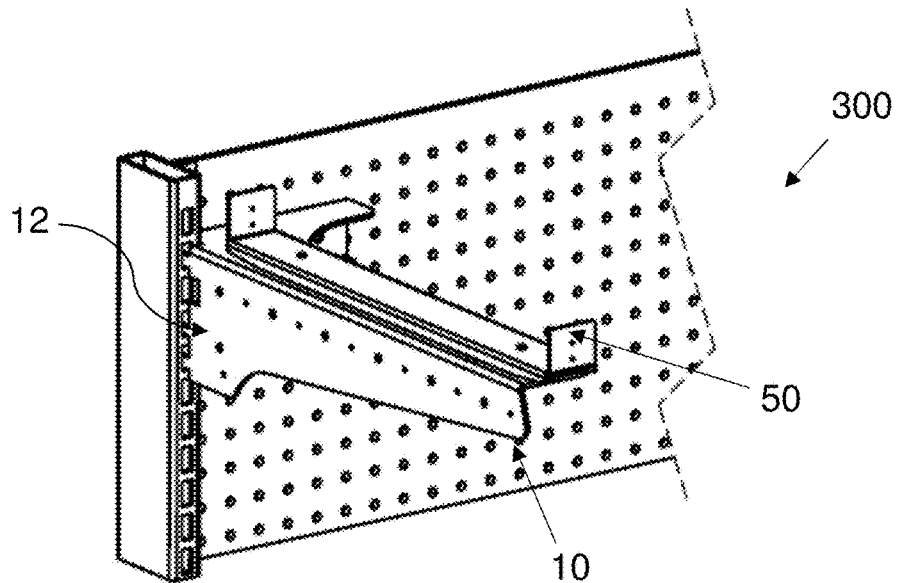

In some embodiments, the ratio of $W_{CO}$ to $W_{LCB}$ ($W_{CO}/W_{LCB}$) is within a range of 0.03 to 0.5, 0.03 to 0.4, 0.03 to 0.3, 0.03 to 0.2, 0.03 to 0.15, 0.03 to 0.10, 0.04 to 0.5, 0.04 to 0.4, 0.04 to 0.3, 0.04 to 0.2, 0.04 to 0.15, 0.04 to 0.10, 0.05 to 0.5, 0.05 to 0.4, 0.05 to 0.3, 0.05 to 0.2, 0.05 to 0.15, or 0.05 to 0.10. Loading element 137 may also include a hole 140, which may be a threaded hole, for receiving a load, e.g., for receiving or connecting to an upper, weighing platform, or for supporting a load, e.g., connecting to a base, leg, or support (disposed below load cell body 125) of a weighing system (described with respect to FIG. 11). Load-receiving hole 140 may be positioned at an intersection of central longitudinal axis 102 and transverse axis 104.

In the exemplary embodiment provided in FIGS. 3A and 3B, first and second flexure arrangements form a flexure arrangement 180, mechanically disposed between loading element 137 and measuring beams or spring elements 107a and 107b.

At least one strain gage, such as strain (or "strain-sensing") gages 120, may be fixedly attached to a surface (typically a top or bottom surface) of each of measuring beams 107a and 107b. Strain gages 120 may be adapted and positioned to measure the strains caused by a force applied to the top of the "free" or "adaptive" side 123 of load cell body 125. When a vertical load acts on free end (i.e., an end unsupported by the base, as shown in FIG. 4) 123 of load cell body 125, load cell body 125 undergoes a slight deflection or distortion, with the bending beams assuming a double-bending configuration having an at least partial, and typically primarily or substantially, double-bending behavior. The distortion is measurably sensed by strain gages 120.

It may thus be seen that planar load cell assembly 100 is a particular case of a load cell assembly having the load beam and spring arrangement of FIG. 4A. In this case, the number of intermediate flexures is 2, such that m and n both equal zero. In addition, the intermediate flexures are intermediate flexure beam pairs connected by a flexure base. Similarly, the measuring beams are connected at a first end by the fixed end of load cell body 125, and at the opposite end by adaptive end 124 of load cell body 125.

A load cell body 125 may be made from a block of load cell quality metal or alloy. For example, load cell quality aluminum is one conventional and suitable material. In some embodiments, the alloy may advantageously be a magnesium alloy, typically containing at least 85%, at least 90%, and in some cases, at least 92%, at least 95%, or at least 98% magnesium, by weight or by volume. The magnesium alloy should preferably be selected to have an elastic module (E) that is lower, and preferably, significantly lower, than that of aluminum.

Any planar load cell assembly disclosed herein or otherwise suitable for use in this invention is one with a 'high' ratio of width to thickness, where 'width' is the dimension across a plan view of the planar load cell assembly, for example the dimension indicated by the arrow marked with w in FIG. 4A, and thickness is the dimension across a side view, for example the dimension indicated by the arrow marked with t in FIG. 4B. Although the figures attached herewith are not necessarily drawn to scale, the exemplary load cell assembly of FIGS. 4A and 4B can be seen to have a width-to-thickness ratio of more than 10. In some embodiments, the 'high' width-to-thickness ratio can be more than 3 or more than 4, and more typically more than 6, more than 8, or more than 10.

Stabilization of the Weighing Assembly

Referring back to FIG. 3A, it can be seen that the exemplary weighing assembly 10 can have a three-dimensional structure comprising at least three substantially planar members in different respective planes. According to the x-y-z axes shown in FIG. 3A, the weighing assembly 10 comprises a 'vertical' member 21 in the y-z plane, a 'horizontal' member 22 in the x-z plane, and a further 'vertical' member 23 in the x-y plane. Each of the three planar members can play a role in serving to immobilize a weighing assembly 10 attached to a shelving unit 300.

Joining the shelf bracket 12 portion of a weighing assembly 10 to an upright 85 of a gondola-type shelving unit 300 by means of bracket hooks 13 may be adequate to render a shelf 90 placed thereupon sufficiently immobilized enough for the ordinary function of remaining horizontal within a reasonable tolerance for displaying products. However, a tighter tolerance might be required for effective deployment and operation of load cell assemblies 100 in intelligent shelves used for tracking inventory and facilitating retail sales transactions. In embodiments, it can be necessary to stabilize a weighing assembly in order to minimize any movement of a shelf bracket or any rotation of a shelf bracket about any axis of the x, y or z axes, because the four (or more) load cell assemblies of left and right weighing assemblies are all desired to be horizontal and level in order for the weight indications generated by the weight assemblies to be as accurate and as reliable as possible. Horizontal can mean on the x-z plane, with a tolerance within ±3°, within ±2°, within ±1°, within ±0.8°, within ±0.5°, within ±0.3°, within ±0.25°, within ±0.20°, within ±0.15°, within ±0.12°, within ±0.10°, within ±0.08°, within ±0.06°, within ±0.05°, within ±0.04°, within ±0.035°, within ±0.030°, within ±0.025°, or within ±0.020°.

Therefore, according to embodiments, it can be helpful to provide additional measures for enhancing the stabilization and immobilization of shelf brackets and the loads they support.

Figure 5:
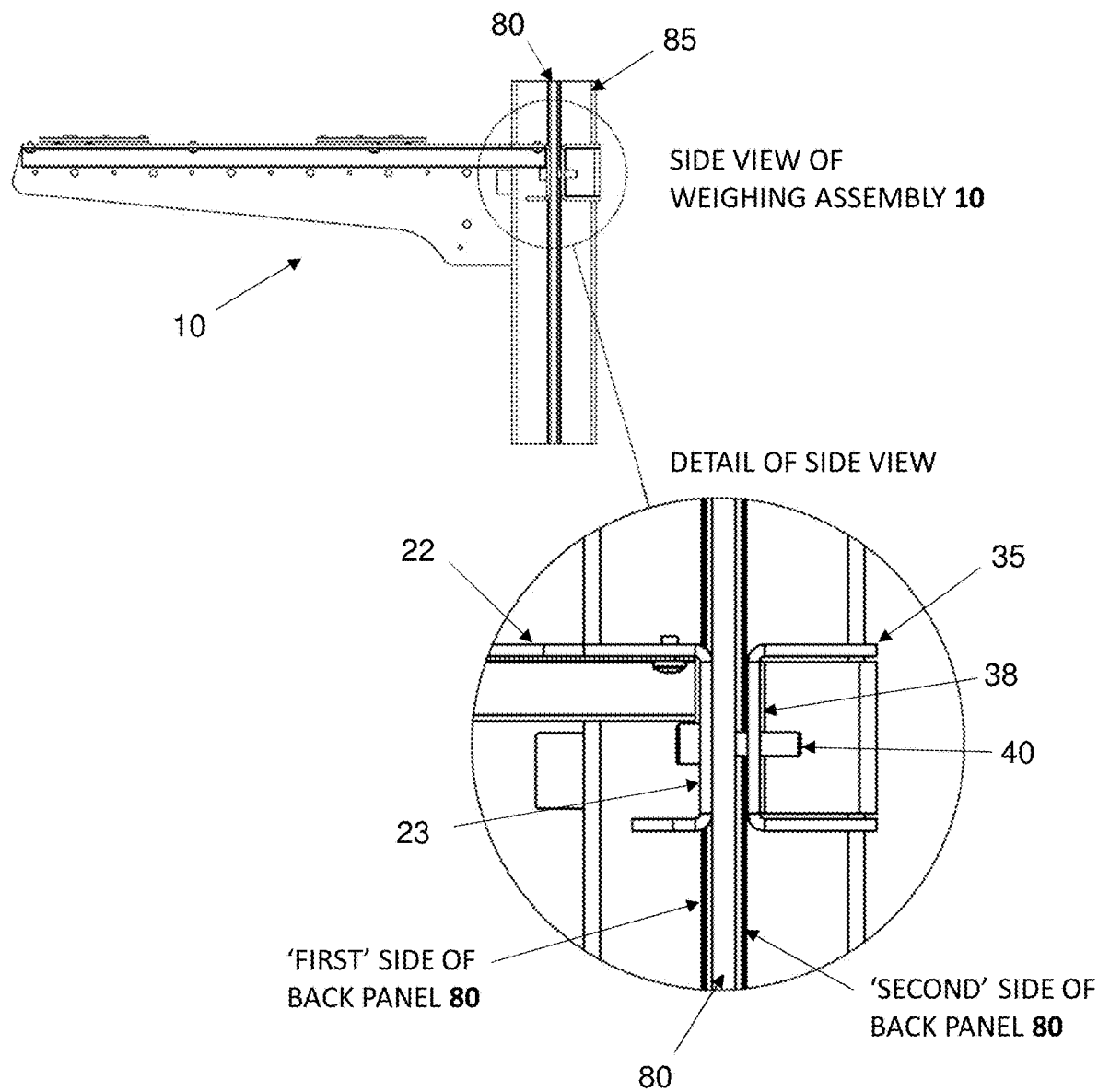
FIG. 5 is a side view of a weighing assembly including a shelf bracket secured to an upright, and a detail of the attachment of a stabilization member of the shelf bracket through the back panel of a shelving unit to a stabilization element, according to embodiments.
Figure 6:
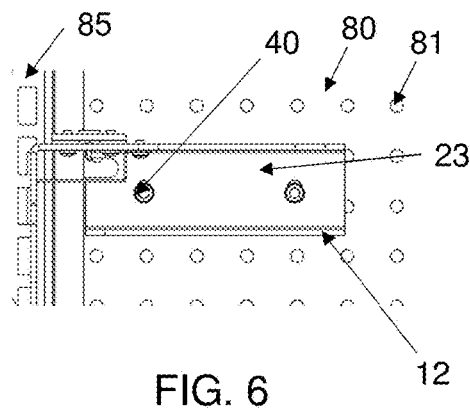
FIG. 6 is an elevation view of the stabilization member of the shelf bracket of FIG. 5, showing a plurality of connection elements according to embodiments.
Figure 7:
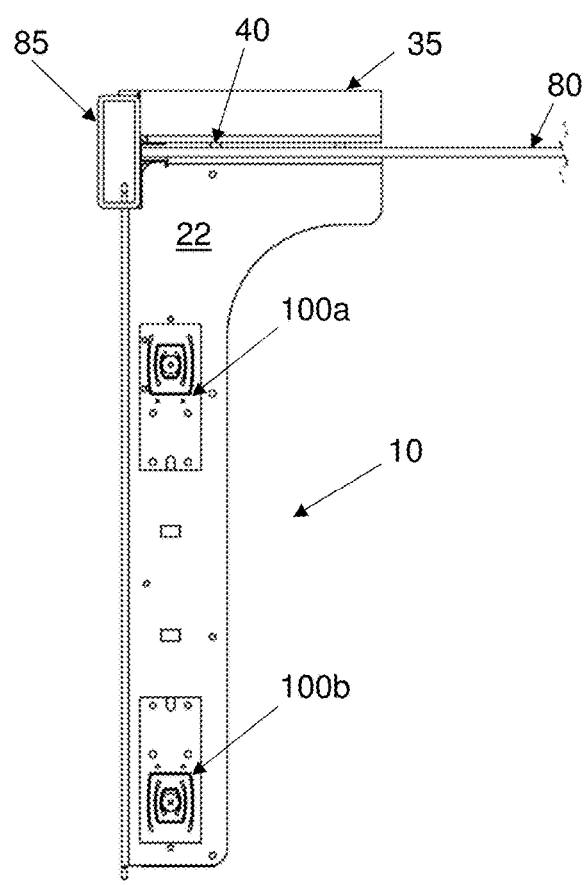
FIG. 7 is a top view of the assembly of FIG. 5.

FIGS. 5, 6 and 7 illustrate an example of providing a stabilization element 35, for example, for the purpose of stabilizing and immobilizing the shelf brackets 12. As mentioned above, the shelf bracket 12 includes a vertical (x-y plane) member 23 designed to be flush or close to flush with the back panel 80 of a shelving unit 300. In the embodiment illustrated in FIGS. 5, 6 and 7, an x-y plane member 35 of the stabilization element 35 is joined to the x-y plane member of the shelf bracket 12 by means of one or more connection elements 40. The connection element 40, which can be a screw, a rivet, or any other appropriate mechanical connector, can pass through the back panel 80 of the shelving unit 300 through a hole 82. In FIG. 6, an elevation view of the x-y plane member 23 of the shelf bracket 12 is shown, with two connection elements 40 passing through the back panel 80. In other embodiments, more than two connection elements may be used, or alternatively only one—the important thing is that the connection effectively immobilizes the shelf bracket.

Figure 8:
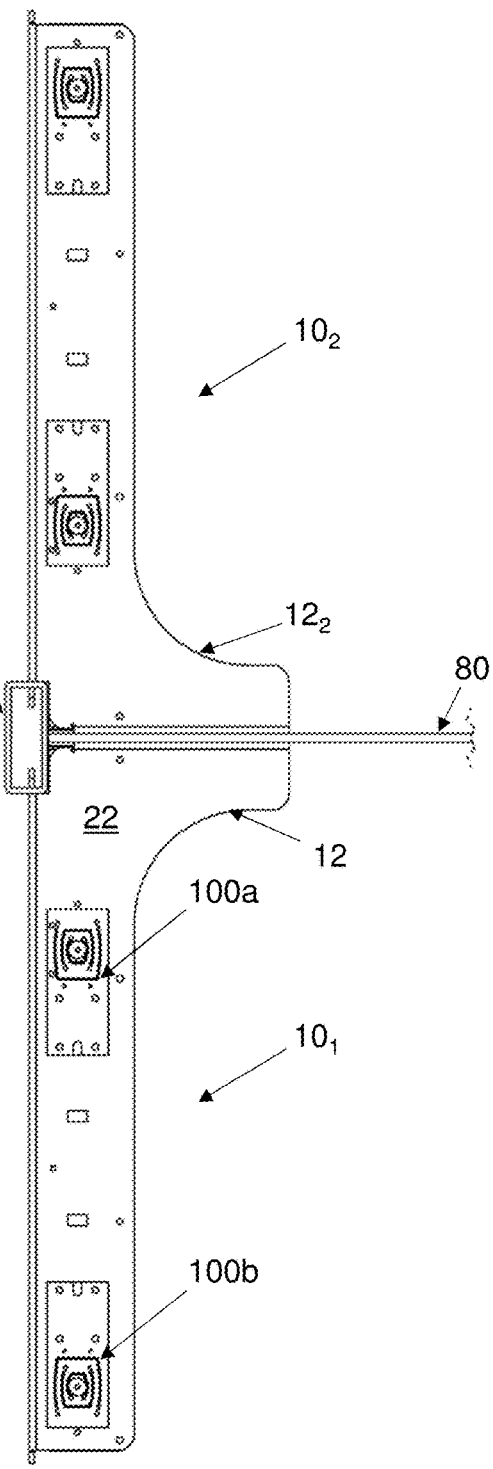
FIG. 8 is a top view of two weighing assemblies including respective shelf brackets, both secured to an upright and attached to each other through the back panel of a shelving unit, according to embodiments.

Another non-limiting example of stabilizing the shelf brackets 12 against movement or rotation is illustrated in FIG. 8. Rather than providing a separate stabilization element 35 as in the previous example, in this embodiment the x-y plane member $23_1$ (not shown in FIG. 8) of the shelf bracket $12_1$ of weighing assembly $10_1$ is joined by connection element(s) 40 (not shown in FIG. 8) to a respective x-y plane member $23_2$ of the shelf bracket $12_2$ of a second weighing assembly $10_2$ installed on the second side of the back panel 80. The arrangement illustrated in FIG. 8 is commonly deployed in double-sided gondola shelving systems 300 such as the one illustrated in FIG. 1. The use of a separate stabilization element 35 is generally appropriate for use in a single-sided gondola shelving system, i.e., where no shelf bracket is to be installed on the back side of the back panel. In some embodiments, however, the separate stabilization element 35 is used for stabilizing shelf brackets even in double-sided gondola shelving units, for example when a shelf on the second side of the back panel is installed at a different height than that of a shelf on the first side. In some embodiments, therefore, both methods of stabilization may be used: wherever back-to-back shelf brackets are installed at the same height, then the shelf brackets can be joined to each other as in FIG. 8, while in other places in a shelving system, where back-to-back brackets are installed at different heights, then the separate stabilization element can be used as in FIGS. 5, 6 and 7.

Figure 9:
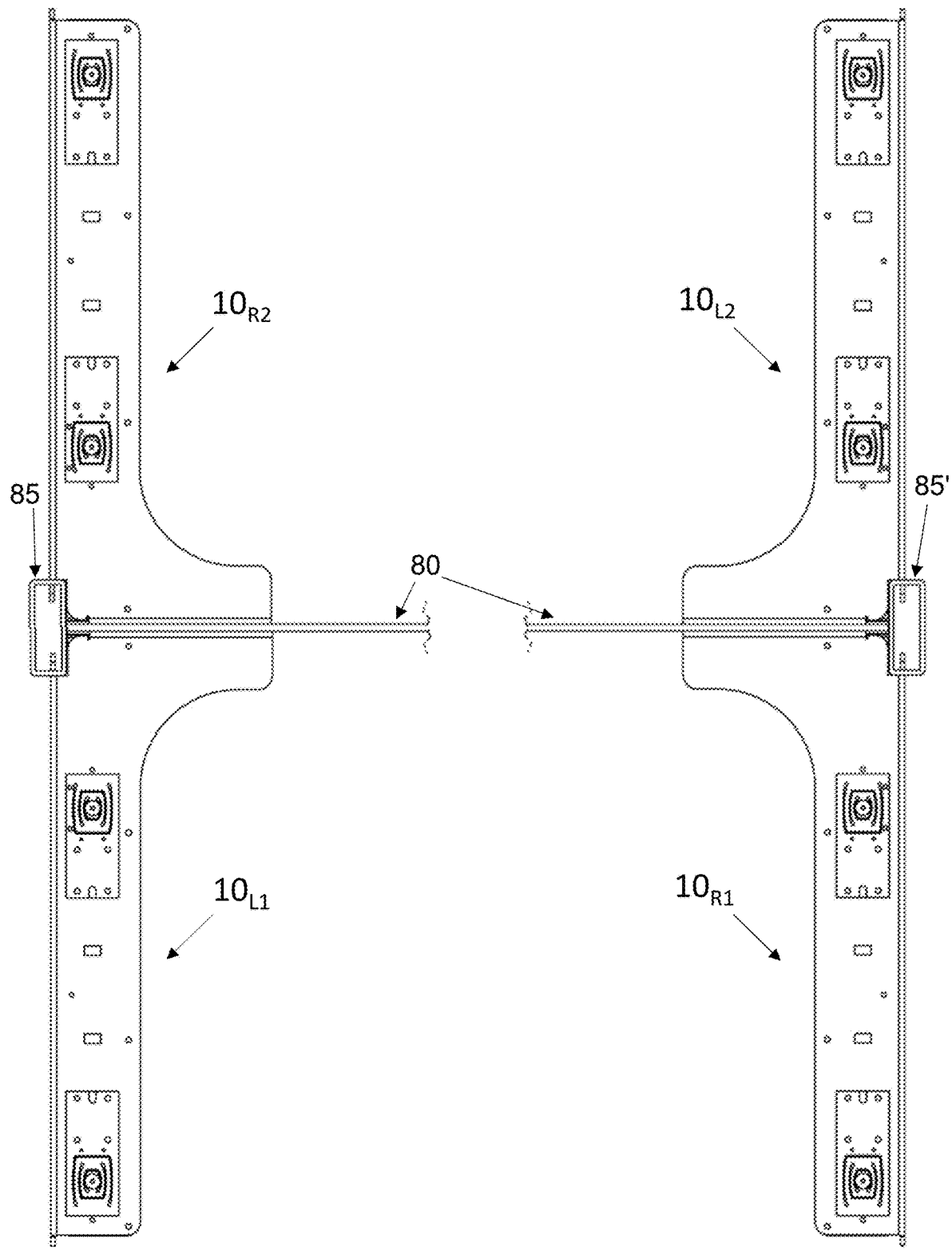
FIG. 9 is a top view of two left-right pairs of weighing assemblies including respective shelf brackets, all secured to respective uprights and attached to corresponding weighing assemblies of the other pairs through the back panel of a shelving unit, according to embodiments.

It can be seen that the two weighing assemblies $10_1$, $10_2$ shown in FIG. 8 are not of exactly the same design—rather, they are substantially mirror images of each other. Referring now to FIG. 9, two pairs of weighing assemblies 10 are illustrated, each pair utilizing one of each design. A first pair, $10_{L1}$, $10_{R1}$, are respectively the left and right weighing assemblies for supporting a single shelf (not shown). The second pair, $10_{R2}$, $10_{L2}$, are respectively the right and left (when viewed from the second side of the shelving unit) weighing assemblies for supporting a second shelf. FIG. 9 also shows a first upright 85 and a second upright 85'. The second upright may be part of a second shelving unit, or may be added by itself to a single shelving unit comprising a back panel and a first upright only, in order to 'finish' the shelving unit (or concatenation of shelving units) and permit the right-side weighing assembly $10_{R1}$ to be installed. It will be obvious to one skilled in the art that in the receiving/securing bracket holes (87 in FIG. 2) in a single upright 85 or 85', there is enough room for the bracket hook (13 in FIG. 2 or 3A) from a second, adjacent shelf bracket. In other words, if a second shelving unit were to be concatenated to the first shelving unit partly illustrated in FIG. 9 (comprising upright 85 and back panel 80), the bracket hook of a respective left-side shelf bracket of the second shelving unit would fit into the same upright hole as the bracket hook of weighing assembly $10_{R1}$. While two pairs of weighing assemblies are shown in FIG. 9 so as to show a 'maximal' case, it will be obvious to the skilled artisan that in some embodiments only a single pair of weighing assemblies (e.g., $10_{L1}$, $10_{R1}$) is provided.

Figure 10:
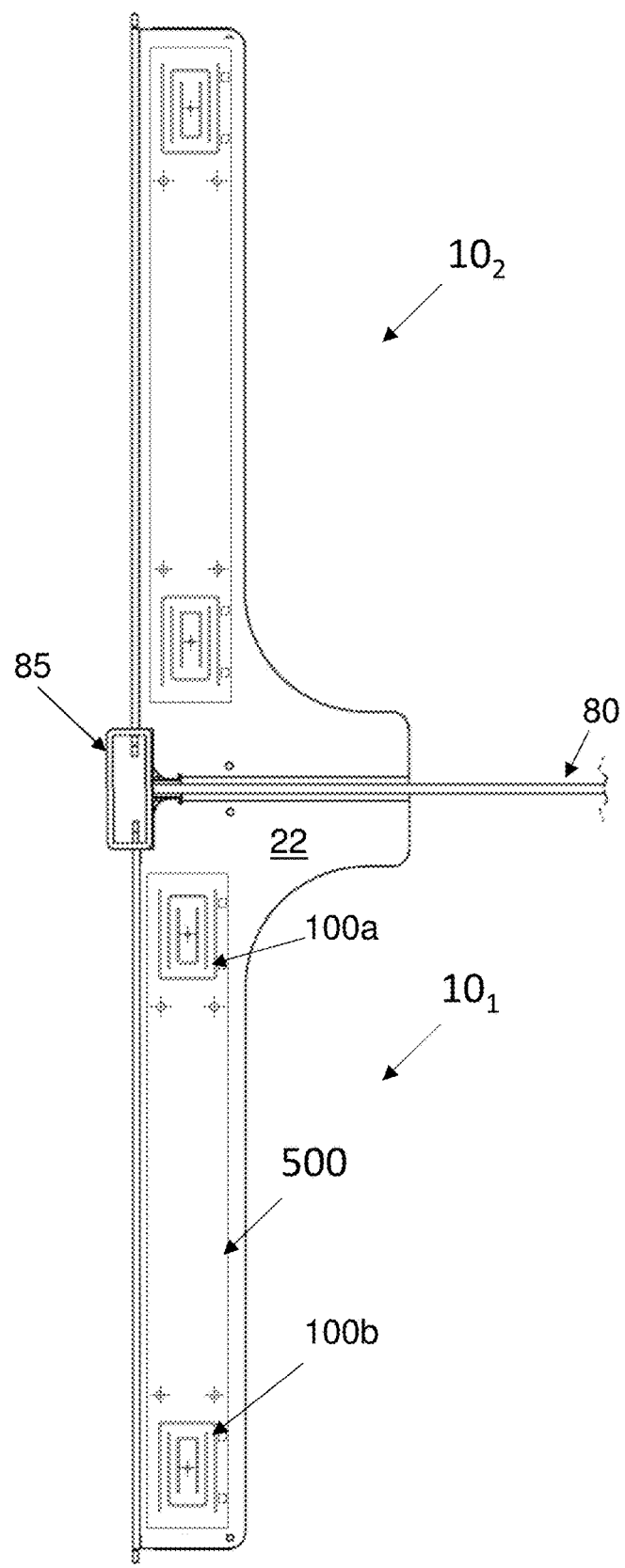
FIG. 10 is a top view of two weighing assemblies including respective shelf brackets as in FIG. 8, employing double-ended planar load cell assemblies, according to embodiments.

Earlier discussion has assumed that load cell assemblies 100a and 100b installed in a weighing assembly 10 are separate elements. FIG. 10 shows an alternative embodiment in which a weighing assembly $10_1$ employs a double-ended planar load cell assembly 500 comprising two planar load cell assemblies 100a, 100b, substantially similar or identical to those described hereinabove, but sharing a common, integral load cell body, and generally disposed at opposite ends thereof, symmetrically about a central transverse axis of the load cell body.

Stabilization of the Shelf

In some embodiments it can be desirable to stabilize and immobilize the shelf element of a weighing assembly or shelving assembly. This is not necessarily dependent upon also stabilizing and immobilizing the shelf bracket (to ensure the horizontal disposition of load cell assemblies) as discussed above. It can also be desirable to provide a way of reliably transferring the load of the shelf (and of products displayed thereupon) to the load cell assemblies.

Referring now in combination to FIGS. 11A, 11B, 12A, 12B and 12C, a weighing assembly 10 including a shelf bracket 12 is shown. The weighing assembly 10, according to the embodiment illustrated in these figures, also comprises: a receiving bracket 50 for receiving a shelf, a plurality of protruding elements 51a, 51b, and a plurality of joining elements 52a, 52b vertically aligned with respective protruding elements 51a, 51b for receiving the respective protruding elements 51a, 51b. It should be noted that the number of respective protruding elements 51 and joining elements 52 will be the same as the number of load cell assemblies 100 for any given weighing assembly 10. In all of the non-limiting examples shown in this disclosure, the number of load cell assemblies 100 is two, and thus two respective protruding elements 51 and two joining elements 52 are shown.

The protruding elements 51a, 51b, together with the joining elements 52a, 52b, can function to transfer the load (weight) of a shelf (not shown in these figures) and any products displayed thereupon to the load cell assemblies 100a, 100b. In some embodiments the protruding elements 51 can transfer the load directly by having a lower end positioned in a receptacle in the load cell assembly 100 and in other embodiments the protruding elements function to ensure the positioning of the joining elements 52 around the holes (140 in FIG. 4A) on the load cell assemblies 100 so as to transfer the load to the load cell assemblies 100 via the joining elements 52. They can also function to inhibit movement of the receiving bracket 50 in the horizontal plane, for example by being installed in or through holes (140 in FIG. 4A) in respective load cell assemblies. In some embodiments, protruding elements 51 and joining elements 52 can be threaded (e.g., a threaded bolt and respective nut) and in other embodiments they can be unthreaded (e.g., a simple bolt and respective washer). In some embodiments both a threaded nut and a washer may be provided. A protruding element 51 can be deployed in any one of a number of approaches. For example, a protruding element can be disposed on a receiving bracket 50. As another example, a protruding element 51 can be disposed on joining element 52. As another example, the protruding elements 51a, 51b can be inserted through holes 53a, 53b in the longitudinal member 56 of the receiving bracket 50, and either (a) (as shown in the example of FIG. 12B) further inserted through holes 140 in load cell assemblies 100a, 100b, and secured by respective joining elements 52a, 52b interposed between the load cell assemblies 100a, 100b and the receiving bracket, preferably flush with the upper surfaces of the load cell assemblies 100a, 100b or (b) be received in receptacles (not shown) in load cell assemblies 100a, 100b and secured by respective joining elements 52a, 52b interposed between the load cell assemblies 100a, 100b and the receiving bracket 50, preferably flush with the lower surface of the receiving bracket 50. In the last example, a head portion of a protruding element 51 can be disposed on the upper surface of the longitudinal member 56 of receiving bracket 50 while the remainder of the protruding element 51 is inserted through the hole 53.

Figure 13:
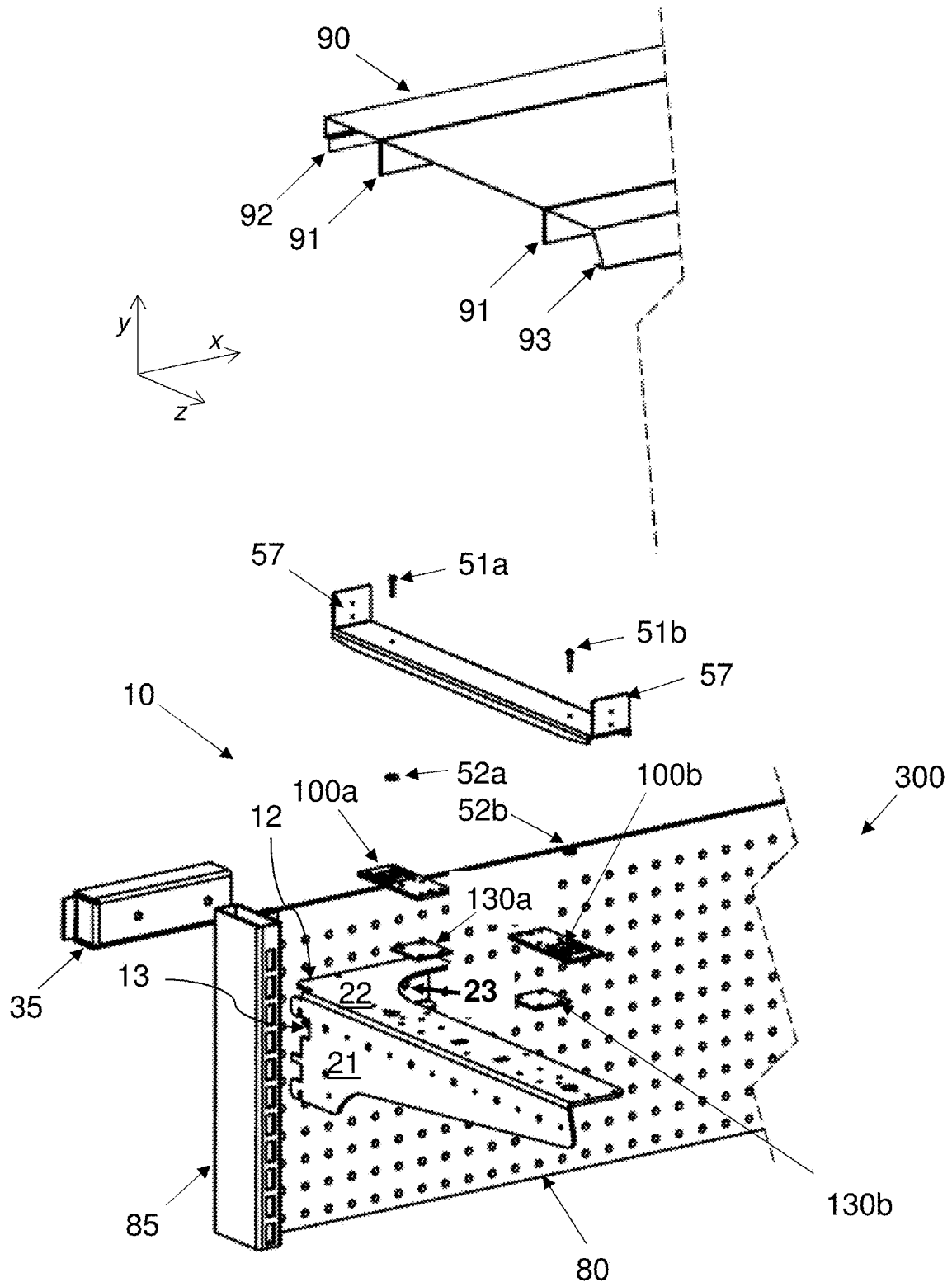
FIGS. 13 and 14A are respectively exploded and assembled perspective views of a weighing assembly including a shelf and a receiving bracket therefor, according to embodiments.
Figure 14A:
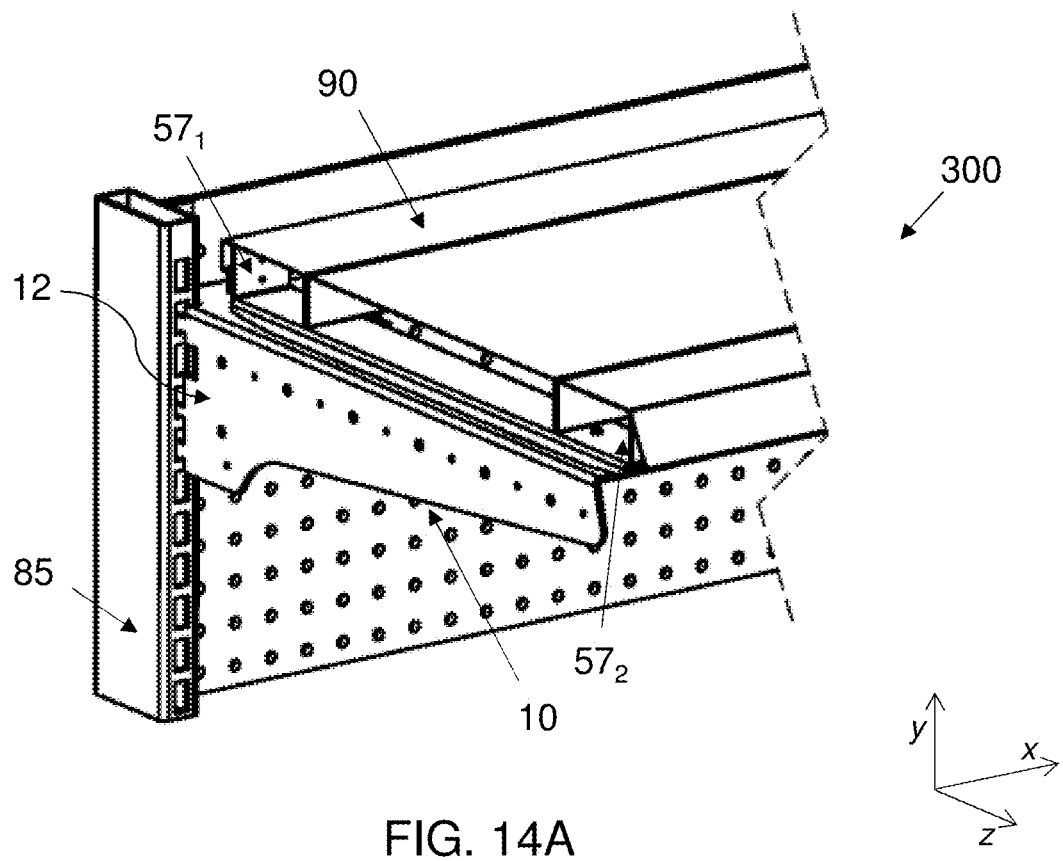
Figure 14B:
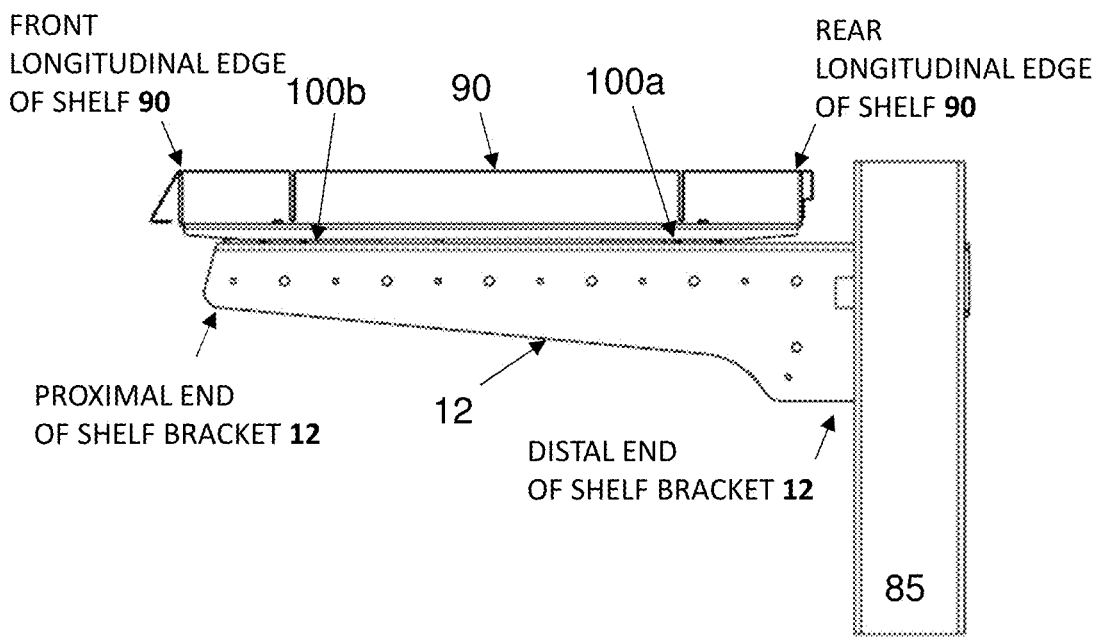
FIG. 14B is an elevation view of the weighing assembly including a shelf and a receiving bracket therefor of FIG. 14A.

Referring to FIG. 13, a metal shelf 90 can have any number of vertically disposed longitudinal members 91 provided mainly for the mechanical stability and/or rigidity of the shelf 90. The members are called 'longitudinal' because they run at least a portion of what is usually the longest dimension in a shelf, and this phrasing is used herein even for the case where a shelf is 'short' and the end-to-end dimension is not the longest, The shelf can also have a front lip 93 (shown as angled but can also be vertical, as the exact angle of the front lip 93 to the body of the shelf 90 is not important here) and a rear flange 92 which also can be vertical or angled like the front lip 93. Substantially vertical members 57 of receiving bracket 50 are positioned so as to engage one or preferably more of the longitudinal members 91, front lip 92 and rear flange 92, such that movement of the shelf in the z-axis is limited or inhibited. FIG. 14A shows the exploded elements of FIG. 13, assembled, and it can be seen that the position of first vertical member $57_1$ of the receiving bracket 50 next to rear flange 92 of the shelf 90 prevents the shelf 90 from slipping in a first direction on the z-axis, or at least limits the extent of the movement, while the position of second vertical member $57_2$ of the receiving bracket 50 next to front lip 93 of the shelf 90 prevents the shelf 90 from slipping in a second direction on the z-axis (or, again, limits the extent of the movement)—the first and second directions corresponding to frontwards and rearwards. FIG. 14B provides a side elevation view of the assembly drawing of FIG. 14A. As can be seen, the rear longitudinal edge of shelf 90 does not necessarily sit all the way 'back' on the shelf bracket 12, and in this example sits between load cell assembly 100b and the distal end of the shelf bracket 12. Similarly, the shelf can 'stick out' further (e.g., from a back panel 80 of a shelving unit 300, neither shown in FIG. 14B) than does the proximal end of the shelf bracket 21. In other words, the proximal end of the shelf bracket 12 can be disposed anywhere between the front longitudinal edge of the shelf 90 and rear longitudinal edge of the shelf 90; the only guiding principle is that all load cell assemblies (in this example: 100a, 100b) be disposed under a portion of the shelf 90 so as to bear the entire load of the shelf 90 and, in embodiments, produce weight indications therefor.

Self-Stabilized Weighing Assembly with Two Shelf Brackets

In embodiments, it can be desirable to achieve the benefits of the present invention without using shelf stabilization. This can be accomplished, in a non-limiting example, by providing a weighing assembly that includes two shelf brackets and components that provide sufficient rigidity and stabilization such that the need for a stabilizing element (or backing assembly) is obviated.

Figure 15A:
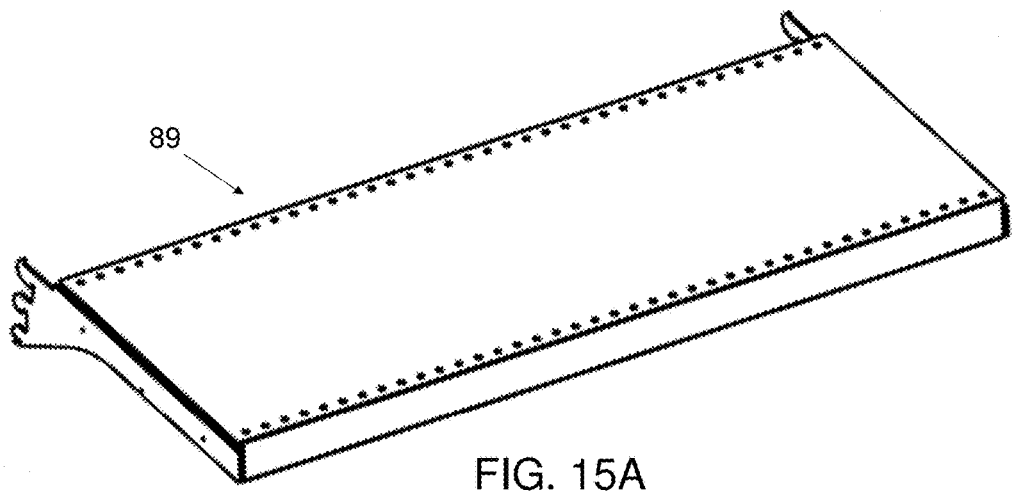
FIGS. 15A and 15B are respectively perspective and exploded perspective views of a weighing assembly including two shelf brackets according to embodiments.
Figure 15B:
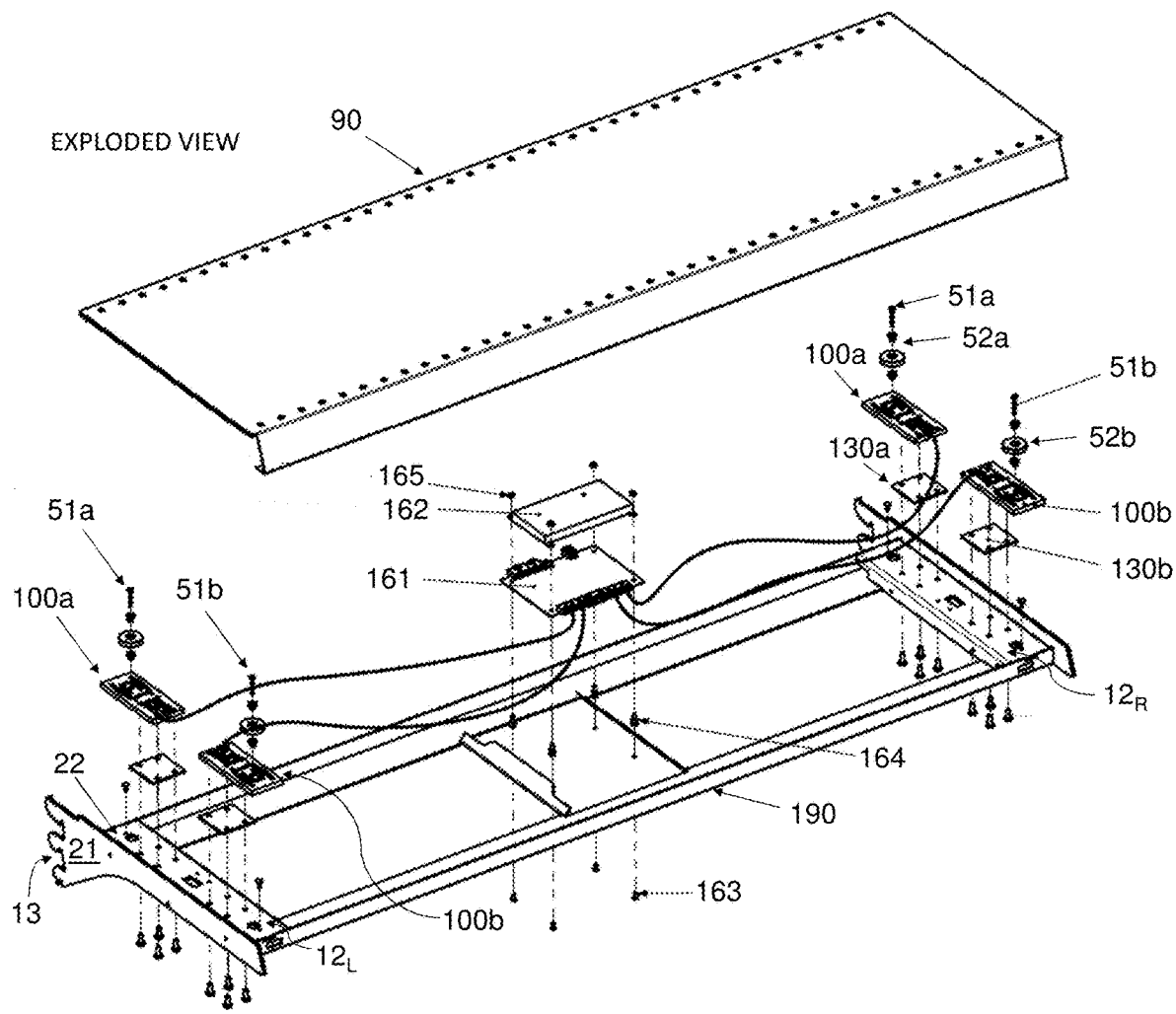

Reference is made to FIGS. 15A and 15B, which respectively, show an assembled weighing assembly 89 comprising two shelf brackets $12_L$ and $12_R$ according to embodiments of the present invention, and an exploded view of the weighing assembly. The weighing assembly 89 of FIGS. 15A and 15B is self-stabilizing, i.e., does not require the use of an additional stabilizing element or connection to a back wall of a shelving unit, and can be installed in a shelving unit (e.g., shelving unit 300) without any tools and by a single employee.

Substantially as shown, each of the two shelf brackets $12_L$ and $12_R$ may comprise a vertical member 21 which includes industry-standard bracket hooks 13 for engaging with uprights 85, and a horizontal member 22. Planar load cells 100 are fixed to the shelf bracket 12, in the same way as illustrated, e.g., in FIGS. 3A, 11A and 13, by anchoring them on a 'base' which, according to embodiments, can include the shelf bracket 12 and a shim (adapter plate) 130. As was discussed with reference to FIGS. 3B and 3C, mounting holes 142 are provided in load cell assembly 100, which line up with similarly-spaced shim holes 143. Thus, load cell assemblies 100A, 100B can be attached (by screw or rivet or any other appropriate attaching method) to a respective shim 130A, 130B and, in this way, complete the installation of the load cell assemblies on the 'base'.

The two shelf brackets $12_L$ and $12_R$ are joined mechanically by a shelf frame 190 which, although illustrated as a simple frame, can include any member(s) such as one or more beam members, which, when joined with the shelf brackets $12_L$ and $12_R$, provide rigidity. The shelf frame 190 can be an 'open structural member' as shown in non-limiting example shown in FIG. 15B, as the 'openness' serves to reduce the weight and cost of the illustrated structural member, but this only is for purposes of illustration and the shelf frame need not be open if it is deemed desirable by a designer to use a solid, non-open member or assembly of members that provides structural rigidity at an acceptable weight and cost. Shelf frame 190 can be fabricated from any material such as a metal or a plastic deemed suitable in terms of rigidity, weight and cost.

As discussed earlier, protruding elements 51a, 51b, together with the joining elements 52a, 52b, can function to transfer the load (weight) of a shelf 90 and any products displayed thereupon to the load cell assemblies 100a, 100b. In embodiments, the protruding elements 51 can transfer the load directly by having a lower end positioned in a receptacle in the load cell assembly 100 and in other embodiments the protruding elements function to ensure the positioning of the joining elements 52 around the holes (140 in FIG. 4A) on the load cell assemblies 100 so as to transfer the load to the load cell assemblies 100 via the joining elements 52. In some embodiments, protruding elements 51 and joining elements 52 can be threaded (e.g., a threaded bolt and respective nut) and in other embodiments they can be unthreaded (e.g., a simple bolt and respective washer). In some embodiments both a threaded nut and a washer may be provided as shown in FIG. 15B. One of ordinary skill in the art will appreciate that various conventional arrangements can be employed for coupling the load (shelf 90) to the load cell assemblies 100a, 100b.

In the non-limiting example of FIG. 15B, a processor 161 is provided on-board the weighing assembly 89 in order to simplify communication with load cell assemblies. In the illustrated example, processor 161 is affixed to the shelf frame 190 with upper fasteners 165 and lower fasteners 163. A processor cover 162 can be provided, e.g., to protect the processor from dust, moisture or detritus, and spacers 164 may be used to isolate the processor from a metallic shelf frame 190.

Incorporation in a System

Figure 16:
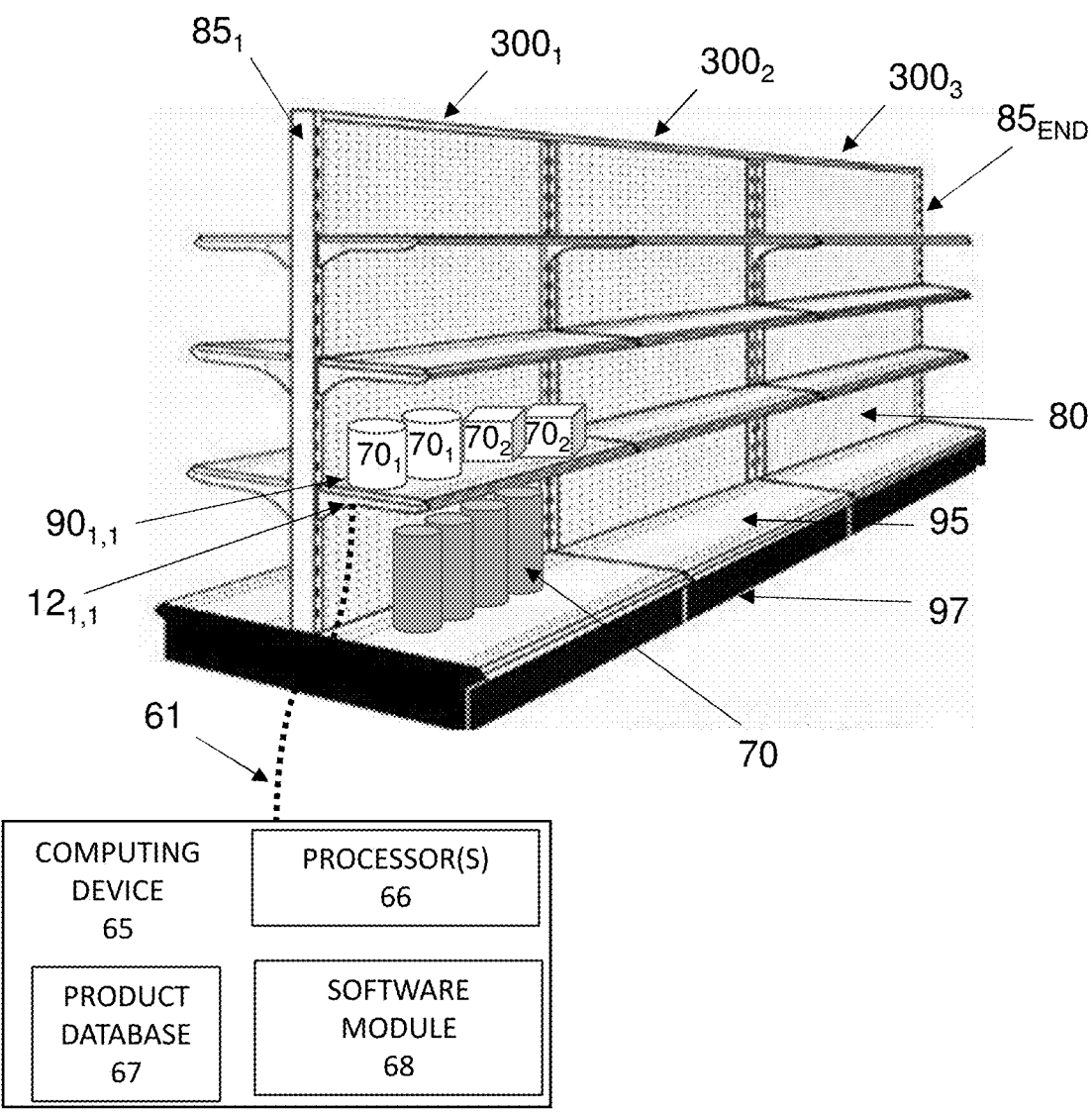
FIG. 16 is a schematic drawing of the double-sided gondola-type shelving arrangement comprising three shelving units of FIG. 1, showing non-homogeneous products on a shelf and communications connection to a computing device, according to embodiments.

FIG. 16 shows a concatenated assembly of three shelving units 300 similar to those shown in FIG. 1. A variety of different products 70, i.e., non-homogeneous products, can be seen on display in shelving unit $300_1$, including, on shelf $90_{1\text{-}1}$ (the double subscript 1-1 indicating the first shelf of the first shelving unit $300_1$) supported by shelf bracket $12_{1\text{-}1}$, a first plurality of products $70_1$ with a first SKU (stock keeping unit)-identifier and a second plurality of products $70_2$ with a second SKU-identifier. The expression 'displayed' merely means that the products are in/on the shelving unit and does not imply that being on display is a limiting feature of any embodiments.

As described earlier in connection with the discussion of FIG. 4A, each load cell assembly 100 can include a processor, which may be configured to receive the load or strain signals from the strain (e.g., from 4 strain gages SG1-SG4) from each particular load cell and to produce a weight indication based on the load signals. Each processor can have a communications arrangement for communicating the weight indication, for example by means of a communications channel (61 in FIG. 16) which can be a wired connection or a wireless connection (as non-limiting examples: any short-range point-to-point communication system such as IrDA, RFID (Radio Frequency Identification), TransferJet, Wireless USB, DSRC (Dedicated Short Range Communications), or Near Field Communication; or wireless sensor networks such as: ZigBee, EnOcean; Personal area networks, Bluetooth, TransferJet, or Ultra-wideband). The communications arrangement of the weighing assembly (or of a processor associated with the weighing assembly) is of course selected so as to be appropriate to the communications technology chosen for the communications channel 61. The communication of weight indication(s) by means of the communications channel 61 can be to a computing device 65 configured to receive information from the weighing assemblies and track the weights of shelves 90 and of the products 70 displayed thereupon. The computing device 65 can include one or more processors 66 for executing computer code, a software module 67 that includes computer code for execution by the one or more processors 66, and/or a product database 67. Preferably, the computer code includes executable instructions for processing the received information about shelf weights (the weight indications) and determining (a) that a change in weight of a shelf has changed, (b) that a product has been added to or removed from a shelf and (c) which product has been added to or removed from a shelf. Preferably, the computing device 65 receives weight indications from all of the individual load cell assemblies installed in both of the weighing assemblies that support any one specific shelf, so that the determinations will be more accurate and more reliable. The determination (a) that a change in weight of a shelf has changed can be made, for example, by tracking the weight of a shelf over time and comparing one time-based value to another. The determination (b) that a product has been added to or removed from a shelf can be made, for example, by determining that the determined change in the weight of a shelf is substantial enough to be a product movement, i.e., is not below a pre-determined threshold. For example, a child leaving chewing gum on a shelf may register as a change in weight of the shelf, but the change can be determined as not being substantial enough to be a product movement. Similarly, the computer code can be configured to exclude 'false positives' such as a person leaning on the shelf, or a person leaving an unidentified weight (i.e., not correlating with a known product) on the shelf. The determination (c) which product has been added to or removed from a shelf is made by analyzing the change in weight from the addition or removal, and by looking up product weights in a product database 67 which includes product weights and SKU-identifiers. The product database 67 can optionally include statistical and/or historical information about the distribution of weight for a particular product/SKU-identifier. The determining can optionally include applying the statistical and/or historical information to help in the determining.

Methods for tracking non-homogeneous products on a shelf can use a plurality of weighing assemblies that are jointly operable to measure the combined weight of the shelf and of the products arranged thereupon. In an example, a method comprises: (a) monitoring weight measurement data corresponding to the weight of the shelf and the products arranged thereupon, said weight measurement data measured by the plurality of weighing assemblies and transmitted therefrom as respective streams of weight measurement data points; (b) responsively to a change over time in the values of said weight measurement data, determining a set of weight-event parameters of a weight event, the set of weight-event parameters comprising a product identification and an action taken with respect to the product, the determining comprising: (i) aggregating, across all of the streams, changes in said weight measurement data corresponding to a specific time, (ii) mapping a change in weight distribution on the shelf, using the aggregated changes in weight measurement data, and (iii) assigning a set of weight-event parameters for resolving the mapped change in weight distribution, using product-weight data retrieved from a product database; and (c) performing at least one of: (i) recording information about the results of the selecting in a non-transient, computer-readable medium, and (ii) displaying information about the results of the selecting on a display device.

In some embodiments, said assigning comprises: (i) identifying at least one candidate set of weight-event parameters for resolving the mapped change in weight distribution, using product-weight data retrieved from a product database, (ii) assigning an event likeliness score to each candidate set of weight-event parameters, and (iii) selecting the set of candidate weight-event parameters having the highest event likeliness score. The determining can use product positioning data from a product positioning plan in at least the identifying. The determining can include calculating a probability in at least the assigning. In some such embodiments, the probability can be calculated using a probability distribution function. In some such embodiments, a parameter of the probability distribution function can be derived using a machine learning algorithm applied to historical weight data for a product. The assigned set of weight-event parameters can include exactly one product and one action, or can include at least one of (i) two or more products and (ii) two or more actions. Said action taken with respect to the product is selected from the group consisting of removing the product from the shelf, adding the product to the shelf, and moving the product from one position on the shelf to another.

Figure 17:
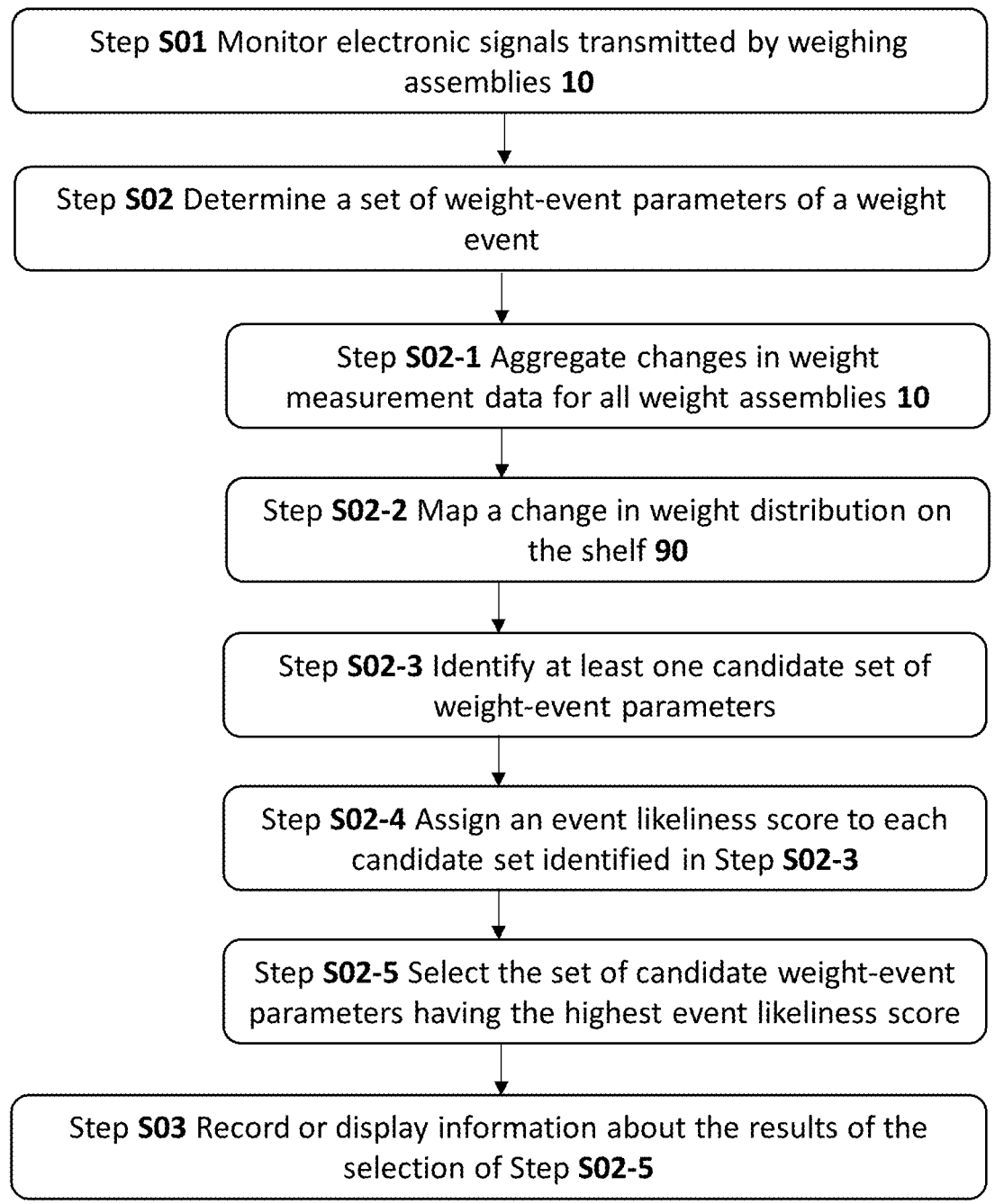
FIG. 17 shows a flowchart of a method for tracking non-homogeneous products on a shelf, according to embodiments of the present invention.

A method for tracking non-homogeneous products on a shelf, according to embodiments of the present invention, is now disclosed; a flow chart of the method is shown in FIG. 17. According to the method, a plurality of weighing assemblies 10 is jointly operable to measure the combined weights of the shelf 90 and any and all products 70 arranged thereupon. The method, as shown in the flow chart of FIG. 17, comprises:

Step S01: monitoring electronic signals transmitted by weighing assemblies 10. Each electronic signal is from a different weighing assembly 10, and includes a respective stream of weight measurement data points. The weight measurement data points correspond to the weight of the shelf and the products arranged thereupon and, as mentioned earlier, each point reflects a portion of the total weight that is distributed among all of the weighing assemblies 10. The monitoring of the signals includes assessing the values, for example to detect changes in the weights over time, e.g., a difference between a first weight measurement data point at a first time and a second weight measurement data point at a second time, that can be indicative of an action taken with respect to a product.

Step S02: determining a set of weight-event parameters of a weight event. The determining is carried out in response to a change in values, over time, i.e., from one time point to another (not necessarily a consecutive time point) in weight measurement data. The determining can be carried out in response to such a change in values being greater than a given threshold, or that the absolute value of the change is greater than a given threshold. A weight event is an event in which an action is taken with respect to a product so as to change the weight or weight distribution of products on a shelf. Weight-event parameters include a product identification (or identification of more than one product involved in a single weight event, if appropriate) and an action taken with respect to the identified product (or products). A set of weight-event parameters can include a single product and a single action, or one or more products each associated with one or more actions. The determining can be probabilistic. Uncertainties in carrying out the method can mean that the determining selects the most likely set of weight-event parameters for a weight event. For example, the result of a determining can that that product #1 70₁ being added to a shelf 90 is the 'most likely' explanation for a detected change in weight measurement data, as opposed to product #2 70₂ being added or product #3 being added, both of which can be alternative but ultimately less likely candidates for the determining. The uncertainties can stem from any number of sources, including, for example, inaccuracy of the weighing assemblies or unresolved noise and/or drift in the stream of data points. An additional source of uncertainty can include the time it takes for a measurement made by weighing assembly to stabilize (e.g., as a function of the elasticity of a load cell component or of the shelf itself), combined with a system requirement to resolve the weight-event parameters within a limited amount of time, such that an actual total change in weight might not be captured because of a time constraint or other limitation. Other sources of uncertainty will be enumerated later in this discussion where relevant.

As further shown in the flowchart in FIG. 17, Step S02 includes five sub-steps, as follows:

Step S02-1: aggregating changes in weight measurement data for all weight assemblies 10. As used herein, 'aggregating' has the meaning of 'summing'. As discussed earlier, changes in weight measurement data are aggregated for each specific point in time; the aggregation can be for every point in time in a specific time interval or for all points in time as long as the monitoring of Step S01 continues, or for each determining; or for points in time selected according to a given periodicity or selected randomly; the only requirement is that aggregated data all correspond to a given point in time and therefore the streams are preferably synchronized.

Step S02-2: mapping a change in weight distribution on the shelf 90. A weight of a product placed on the shelf (for example) is distributed to all of the weighing assemblies of a shelf so that the aggregate of the increment in measurements made by all of the weighing assemblies equals the total incremental weight of the product; this step solves for the magnitude and location of the weight of the product placed on the shelf (i.e., or removed from the shelf or moved along the shelf) given the individual weight measurement data of the various weighing assemblies. In some embodiments the mapping can be deterministic, producing a single answer for the magnitude of the weight added/removed/moved and the coordinates of the center of weight of that weight. In other embodiments, the mapping can be probabilistic. For example, instead of mapping to a single weight center (X,Y), the mapping of product weight to x,y coordinates can be considered to have a probabilistic distribution (e.g., a density function). The probabilistic function can take into account, for example, unknowns with regards to the uniformity of the make-up or structure of the shelf, or with regards to possible angular displacement of the shelf from horizontal. It can also take into account inaccuracies in one or more of the weighing assemblies. Using a non-deterministic result out of the mapping sub-step can be another source in uncertainty in the overall determining step. In some embodiments the result of this mapping step can be stored in a repository of weight distribution mappings 51 in computer-readable storage medium 68.

Step S02-3: identifying at least one candidate set of weight-event parameters for the weight event. In this step, product data for reference can be accessed or retrieved from a product database 67 which can include, inter alia, baseline weights for products as well as ranges and distributions of possible and/or historical weights for products. Data for reference can be accessed or retrieved from a product positioning plan 69 (a planogram). The identifying includes matching a weight added/removed/moved ('the event weight') in Step S03-2 with the weight of a product according to data in the product database 67 and/or appearing in the planogram. The matching can return a single deterministic answer or can return an answer consisting of one or more products that may match the event weight, or come close with varying levels of probability. Probability may be assigned according to a wide variety of factors, some of which are illustrated in the following examples:

In an example, two products in the product database both have a weight matching the event weight, but only one of them is in the planogram for the shelf in question. While both products are identified in candidate sets of weight-event parameters, the one appearing in the planogram is assigned a higher probability.

In another example, two products in the product database both have a weight matching the event weight, but they appear in the planogram as belonging on other shelves. One belongs, according to the planogram, on a nearby shelf, while the other appears on a far-away shelf. While both products are identified in candidate sets of weight-event parameters, the one appearing in the planogram on a closer shelf is assigned a higher probability.

In another example, two products appearing in the product database and in the planogram have a weight matching the event weight, and the weight event is an addition to the shelf. The first product was identified with a 'removal' weight-event from the same shelf ten minutes earlier, and the second product was identified with a 'removal' event five minutes earlier. While both products are identified in candidate sets of weight-event parameters, the one identified in a removal weight event five minutes earlier is assigned a higher probability.

In another example, the aggregated change in weight on the shelf was 500 grams. A first product appearing in the planogram for that shelf weighs 50 grams more, according to the product database, and a second product weighs 30 grams less. While both products are identified in candidate sets of weight-event parameters, the product weighing 30 grams less is assigned a higher probability. In another example, the second product weighing 30 grams less 'belongs' on the left side of the shelf according to the planogram and the first product weighing 50 grams more belongs on the right side; according to the mapping of weight distribution in Step S2-02, the weight-center of the weight added or removed was closer to the right side, and the product weighing 50 grams more is assigned a higher probability.

In another example, two products appearing in the product database and in the planogram have a weight matching the event weight, and the weight event is a removal from the shelf. The first product has a sales rate of one can per week, and the second product has a sales rate of five cans per week. While both products are identified in candidate sets of weight-event parameters, the product with the higher sales rate is assigned a higher probability.

In yet another example, two products appearing in the product database and in the planogram have a weight matching the event weight, and the weight event is a removal from the shelf. The first product is 'on sale' this week at a 20% discount, and while both products are identified in candidate sets of weight-event parameters, the product with discount is assigned a higher probability.

In some embodiments, an assigned probability can be calculated using a probability distribution function. A probability distribution function can be pre-programmed based on hypothetical data and/or empirical data. A probability distribution function can be derived using a machine learning algorithm applied to historical weight data for a product.

In an illustrative example, two products appearing in the product database and in the planogram have a weight within three grams on either side of the event weight, and the weight event is a removal from the shelf. Associated with the first of the two product is a history of being 10 grams heavy 20 percent of the time and 5 grams heavy 30 percent of the time. The rest of the time, the product weight is within 2 grams either way of the baseline weight (e.g., the nominal, mean or median weight, or the 'listed' weight in the product database). Associated with the second of the two products is a history of being 10 grams heavy 5 percent of the time and within 3 grams either way of the baseline weight the remainder of the time. A probability distribution function derived using a machine learning algorithm applied to the respective historical weight data (a simplified version of which is presented in the foregoing example) for each of the two products assigns a higher probability to the second product. Nonetheless, both products are identified in candidate sets of weight-event parameters. The skilled artisan will appreciate that the machine learning algorithm selected for deriving probability distribution functions for product weights and calculating probabilities therefrom can be any of those known in the art and suited to the historical product-weight data, such as, for example and non-exhaustively: Linear Regression, Logistic Regression, Decision Tree, SVM, Naive Bayes, kNN, K-Means and Random Forest.

The skilled artisan will appreciate that any of the factors involved in the foregoing examples of assigning probabilities can be combined in any way, along with other intrinsic and extrinsic factors that can affect the assigning of probabilities.

Step S02-4: assigning an event likeliness score to each candidate set identified in Step S02-3. The foregoing discussion with respect to Step S02-3 included assigning probabilities to candidate sets of weight-event parameters, the assigning of an event likeliness score takes other factors into account as well, in addition to the probabilities assigned in Step S02-3. The 'other factors' can include the uncertainties discussed earlier including factors related to the weight measurement data, to noise and drift, to the uncertainty in mapping the weight distribution on the shelf, and so on. Thus, a final event likeliness score is assigned to each candidate set of weight-event parameters, so as to account for all of the uncertainty introduced in the various steps of the method.

Step S02-5: selecting the set of candidate weight-event parameters having the highest event likeliness score assigned in Step S02-4. The result of the 'selecting' in the last sub-step of Step S02 is therefore the result of the 'determining'.

Step S03: recording or displaying information about the results of the selection of Step S02-5. The results of the selecting (i.e., of the determining) can be recorded, for example in the non-transient computer-readable storage medium 68, or in a similar storage medium in another location, for example in the 'cloud', where the results are transmitted via an internet connection. The results, alternatively or additionally, can be displayed on a display device, such as display device 62 or on another display device, which, for purposes of illustration, can be one intended to convey information to a customer of an unattended retail arrangement, or the screen of an inventory clerk in a storage warehouse.

Any of the steps of the method can be carried out by the one or more computer processors 66. In some embodiments, not all of the steps of the method are necessarily carried out. In some embodiments, a system, e.g., the system 100 shown in FIG. 6, can be for tracking non-homogeneous products on a shelf and can comprise a plurality of weighing assemblies 10, one or more computer processors 66, and a computer-readable storage medium 68 containing program instructions 50 which, when executed by the one or more processors 66, can cause the one or more processors 66 to carry out the steps of the foregoing method.

Additional methods for tracking and disambiguating non-homogeneous products are disclosed in co-pending International Patent Application PCT/IB2019/055488, filed on Jun. 28, 2019, and published as WO/2020/003221 on Jan. 2, 2020, which is hereby incorporated by reference for all purposes as if fully set forth herein.

In some embodiments, non-weighing sensors such as, for example, optical sensors or barcode readers, can be used in conjunction with any of the weighing sensors, weighing assemblies and shelf arrangements disclosed herein. Such sensors can be expensive and/or unreliable and/or difficult to maintain or suffer from other disadvantages, and therefore in other embodiments, exclusively weighing sensors are used for disambiguating non-homogeneous products. In such 'weighing-only' embodiments, systems for tracking products on a shelf, or systems for unattended retail sales transactions and/or tracking inventory are devoid of other such sensors, i.e., optical sensors, barcode readers, or manual input devices and the like for identifying specific products or SKU's. In some such embodiments in which solely weighing sensors are used in tracking and disambiguation, environmental sensors such as temperature sensors and noise-detecting sensors may be used in the analysis of streams of weight data points received from weighing assemblies but not directly in the disambiguation of non-homogeneous products. Thus, it can be said that a system or method as disclosed herein uses only weight-related information, or is devoid of non-weighing sensors or of optical sensors, or that the methodology of product identification is independent of optical information (e.g., from such optical sensors), and this does not preclude the use of environmental sensors in analyzing (including, optionally, modifying) streams of data points received from weighing assemblies.

Figure 18:
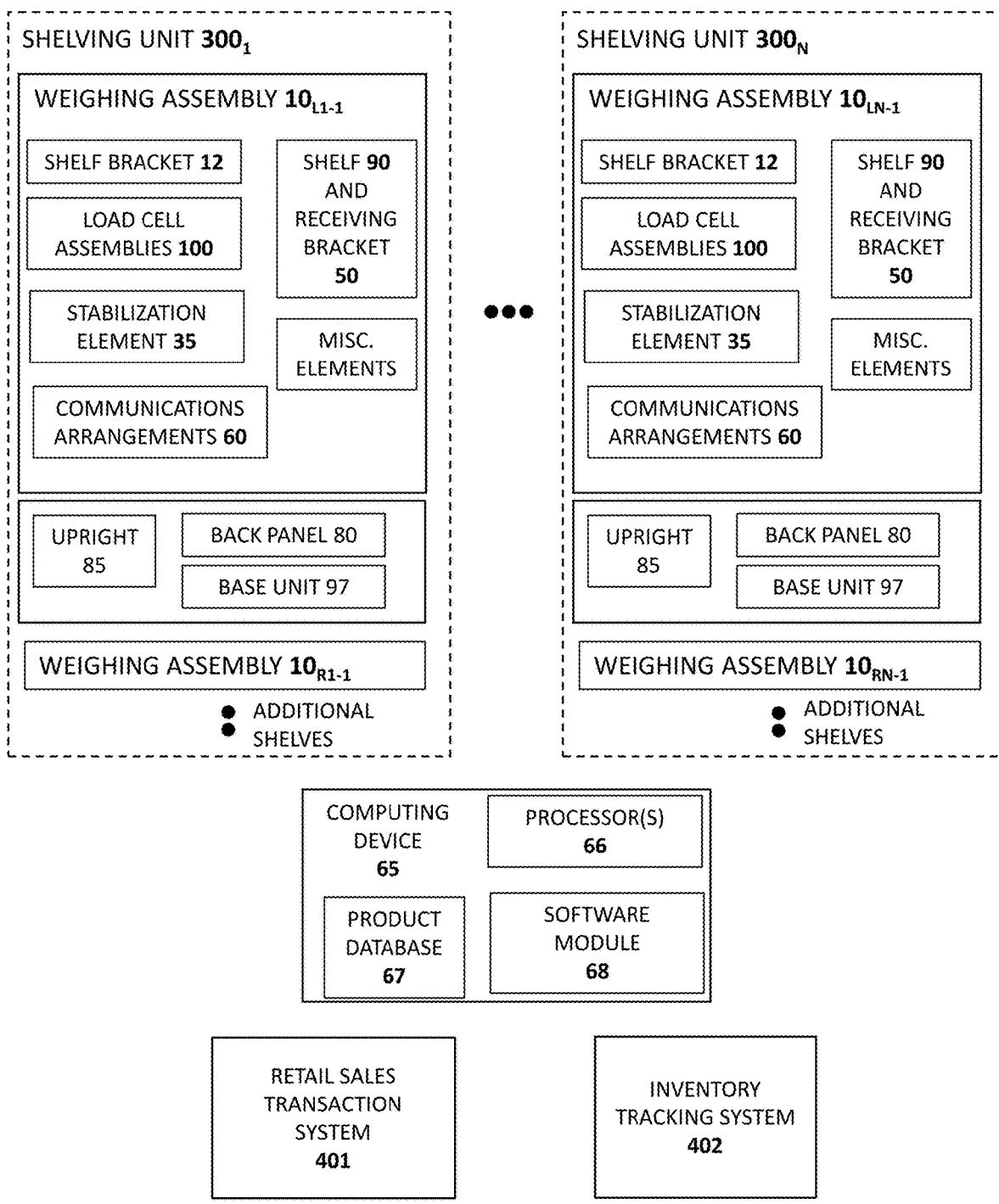
FIGS. 18 and 19 are block diagrams of respective multi-unit shelving arrangements, each in communication with a computing device and at least one of a retail sales transaction system and an inventory tracking system, according to embodiments.

FIG. 18 includes a block diagram showing details of a system for executing unattended retail sales transactions and/or tracking inventory of products, using any of the embodiments of weighing assemblies (e.g., weighing assemblies 10) and shelving arrangements disclosed herein. Such a system includes one or more shelving units $300_1 \ldots 300_N$, each of which can include any of the weighing assembly features shown. Each shelving unit include a number of shelves 90, each supported by a left-and-right pair of weighing assemblies 10 including shelf brackets 12. Each pair of weighing assemblies 10 includes a weighing assembly 10 for supporting a different end of the shelf 90. As an example, weighing assemblies $10_{L1-1}$ and $10_{R1-1}$ are respective the left and right assemblies for support a first shelf $90_{1-1}$ in first shelving unit $300_1$. Each of the load cell assemblies 100 installed in the system can communicate weight information with computing device 65. Once computing device 65 determines that a product has been added to or removed from a shelf, and further determines which specific product has been added to or removed from a shelf (as discussed earlier in connection with FIG. 16), then the information can be forwarded to a retail sales transaction system 401 and or an inventory tracking system 402.

It will be appreciated by those of skill in the art that not all of the elements in the block diagram in FIG. 18 need be present in order to practice the invention.

Figure 19:
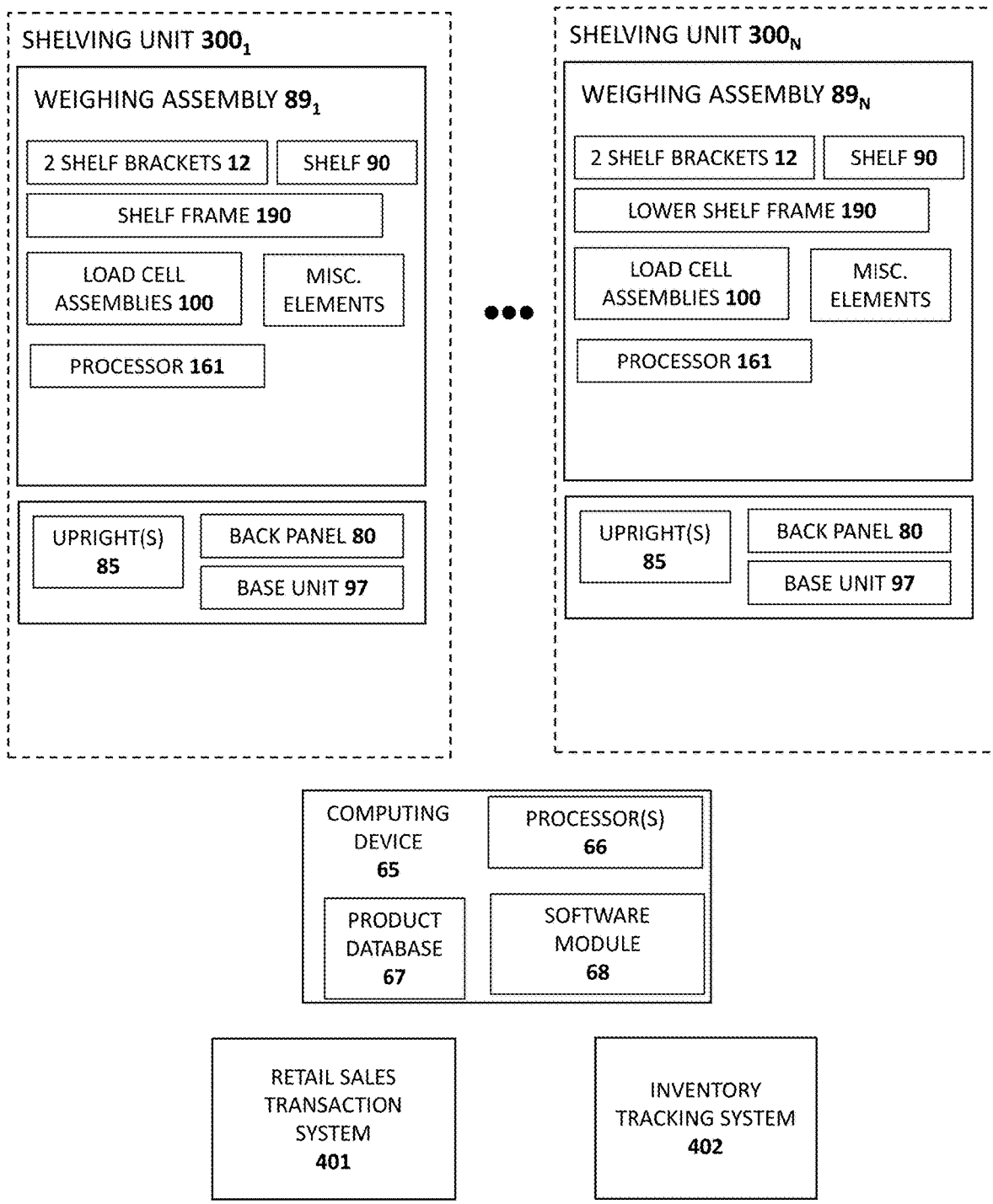

FIG. 19 includes a block diagram showing details of a system for executing unattended retail sales transactions and/or tracking inventory of products, using weighing assemblies 89 and shelving arrangements disclosed in the discussion of FIGS. 15A and 15B. Such a system includes one or more shelving units $300_1 \ldots 300_N$, each of which can include any of the weighing assembly features shown. Each shelving unit include a number of weighing assemblies 89. Each weighing assembly 89 includes shelf brackets $12_L$ and $12_R$; shelf 90, shelf frame 190, load cell assemblies 100, processor 161 and miscellaneous elements for assembly, internal stabilization and the like. Each of the load cell assemblies 100 installed in the system can communicate weight information with computing device 65. Once computing device 65 determines that a product has been added to or removed from a shelf, and further determines which specific product has been added to or removed from a shelf (as discussed earlier in connection with FIG. 16), then the information can be forwarded to a retail sales transaction system 401 and or an inventory tracking system 402.

It will be appreciated by those of skill in the art that not all of the elements in the block diagram in FIG. 19 need be present in order to practice the invention.

Figure 20:
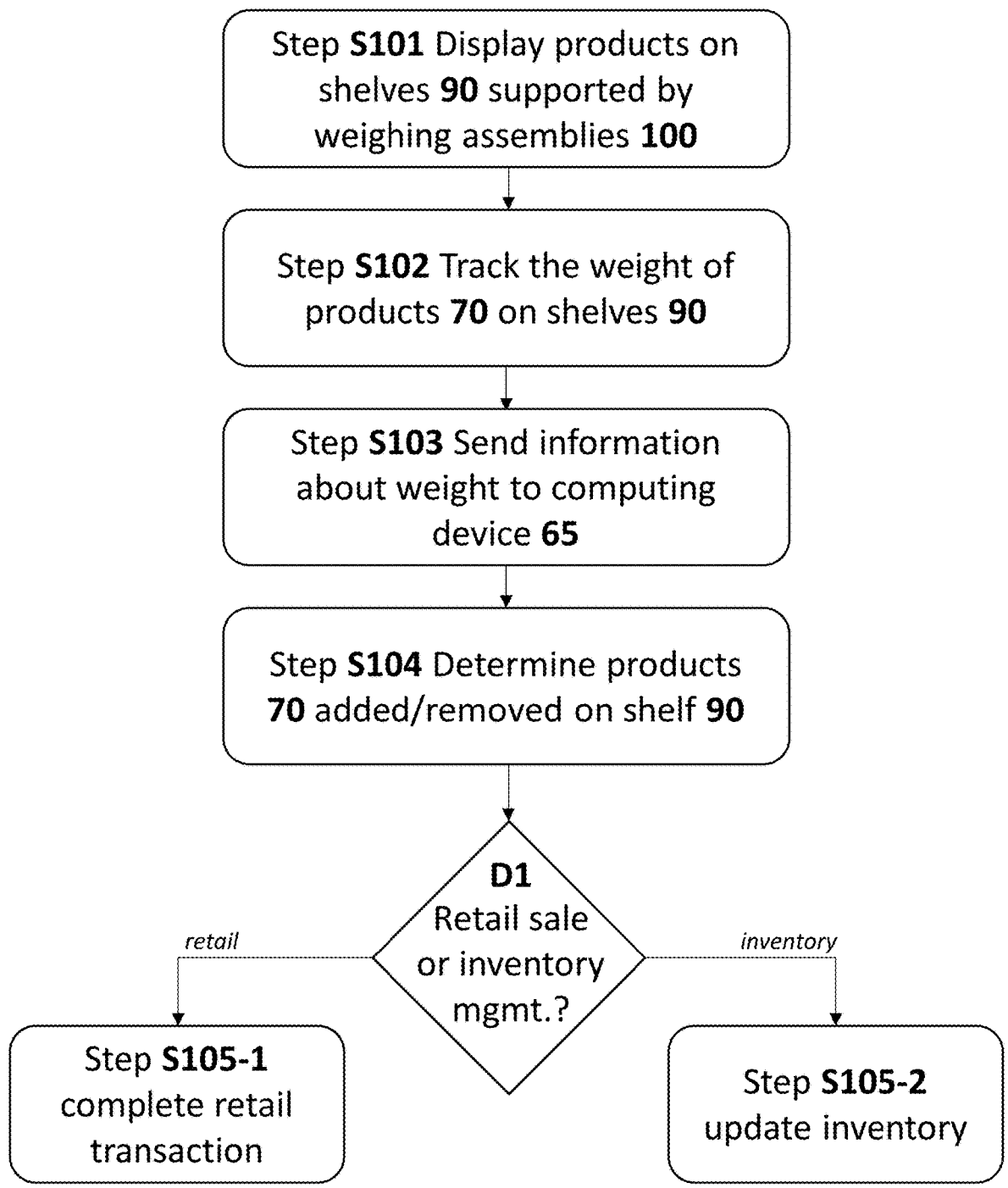
FIG. 20 shows a flowchart of a method for using weighing assemblies in a shelving arrangement to perform retail transactions and/or inventory management.

Referring now to FIG. 20, a method is disclosed for executing unattended retail sales transactions and/or tracking inventory of products, using any of the embodiments of weighing assemblies and shelving arrangements disclosed herein. According to embodiments, the method includes:

Step S101 displaying products on shelves 90 which are supported by weighing assemblies 100 according to any of the embodiment disclosed herein. Products need not be homogeneous, as in later step S104 a determination will be made as to which products are added and or removed on a shelf.

Step S102 tracking the weight of products 70 on shelves 90, using the load cell assemblies 100 installed in the weighing assemblies supporting each shelf.

Step S103 sending information about the weight of products to the computing device 65. As described earlier in connection with FIGS. 15 and 16, this includes communication of information about weight indications from the processors of the load cell assemblies 100 by means of a communications channel 61.

Step S104 determining which products 70 were added to or removed from a shelf 90, as discussed earlier in connection with FIG. 16.

Decision Step D1 as to whether the information is to be used in a retail sale transaction or for inventory management, or for both. The result of the decision is of course known and included in the computer code of the system.

Step S105-1 complete retail transaction if that is a result of Decision Step D1.

Step S105-2 update an inventory entry if that is a result of Decision Step D1.

It will be appreciated by those of skill in the art that not all of the steps of the method need be carried out in order to practice the invention.

As used herein in the specification and in the claims section that follows, the term "generally", with respect to orientations and measurements such as "parallel" and "central", is meant to limit the deviation to within ±10%. More typically, this deviation is within ±5%, ±3%, ±2%, ±1%, ±0.5%, ±0.2%, or less.

Unless otherwise defined herein, words and phrases used herein are to be understood in accordance with their usual meaning in normal usage. Some terms used herein are terms of art in the industries that supply and use shelving assemblies, for example (and not exhaustively): an "upright" is a post or rod fixed vertically as a structural support for other components in a shelving unit and to bear the load of the shelves and any goods displayed thereupon, generally including holes or other arrangements along at least two faces for the attachment of shelf brackets. An upright, unless it is at the end of continuous run of shelving, is shared by two adjacent shelving units and therefore a standard "shelving unit" is considered to include only one upright. A "shelf bracket" is a support adapted to be secured to an upright so as to support a shelf; generally, at least two shelf brackets are required to support a shelf—one at each end, although there are designs with only one bracket per shelf. "Double-sided" shelving units or "shelving bays" are those which have shelving on both sides of the "back panel," while "single-sided" shelving units are those which have shelving only on one side. In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a shelf" or "at least one shelf" may include a plurality of markings.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A weighing assembly for weighing a shelf, the weighing assembly comprising:
   a. a shelf bracket comprising a horizontal member configured to support the shelf in an x-z plane that is parallel to a floor, and a first vertical member in a y-z plane orthogonal to the x-z plane, and
   b. a load cell assembly fixedly attached to the horizontal member so as to mediate between the horizontal member and the shelf, the load cell assembly comprising:
      i. a load cell body having a free end and an anchored portion, said load cell body including a spring element and at least one receiving element, and
      ii. a strain-sensing gage, bonded to said spring element, said strain-sensing gage adapted to measure a strain in said spring element,
   wherein, in an assembled configuration, (i) said load cell body is attached to said horizontal member at said anchored portion of the load cell body, and (ii) said at least one receiving element is adapted to receive a vertical load from the shelf, said receiving element has (A) an unloaded disposition, and (B) a loaded disposition in which said at least one receiving element receives said vertical load, wherein in said loaded disposition, said free end attains a depressed position with respect to said free end in said unloaded disposition,
   wherein said load cell assembly comprises a double ended load cell.

2. The weighing assembly of claim 1, wherein:
   i. said load cell body has a primary axis, a central longitudinal axis, and a transverse axis disposed transversely with respect to said primary and central longitudinal axes, a broad dimension of said load cell body being disposed perpendicular to said primary axis, and
   ii. said load cell body includes:
      A. a first contiguous cutout window passing through said broad dimension and formed by a first pair of cutout lines disposed generally parallel to said central longitudinal axis, and connected by a first cutout base,
      B. a second contiguous cutout window passing through said broad dimension and formed by a second pair of cutout lines disposed generally parallel to said central longitudinal axis, and connected by a second cutout base, said second contiguous cutout window being transversely bounded by said first contiguous cutout window,
      C. a pair of measuring beams disposed along opposite edges of said load cell body and generally parallel to said central longitudinal axis, each of said measuring beams longitudinally defined by a respective cutout line of said first pair of cutout lines,
      D. a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base, and
      E. a loading element, longitudinally defined by an innermost pair of cutout lines, comprising a receiving element and extending from an innermost flexure base, said transverse axis passing through said loading element.

3. The weighing assembly of claim 2, wherein said load cell body additionally includes:
   F. a third contiguous cutout window passing through said broad dimension and formed by a third pair of cutout lines disposed parallel to said central longitudinal axis, and connected by a third cutout base, and
   G. a second flexure arrangement having a second pair of flexure beams, disposed along opposite sides of said central longitudinal axis, and parallel thereto, said second pair of flexure beams longitudinally disposed between said second pair of cutout lines and said third pair of cutout lines, and mechanically connected by a second flexure base,
   wherein said loading element is longitudinally defined by said third pair of cutout lines, and extending from said second flexure base.

4. The weighing assembly of claim 1, wherein said at least one strain-sensing gage is associated with a processing unit configured to receive strain signals therefrom, and to produce a weight indication based on said strain signals.

5. A shelving arrangement comprising:
   a. a back panel;
   b. first and second uprights associated with said back panel;
   c. first and second weighing assemblies according to claim 1, adapted for being removably mounted to respective said first and second uprights, wherein (i) each of the weighing assemblies comprises a respective second vertical member in an x-y plane that is parallel to the back panel and orthogonal to both the x-z plane and the y-z plane, and (ii) the first and second weighing assemblies are mirror images of each other relative to respective said first vertical members; and
   d. a shelf disposed to be in at least indirect contact with both respective load cell assemblies of said first and second weighing assemblies.

6. The shelving arrangement of claim 5, additionally comprising first and second connecting elements passing through the back panel so as to join respective said vertical members to corresponding bracket-stabilization elements disposed on a reverse side of the back panel.

7. The shelving arrangement of claim 6, wherein the bracket-stabilization element disposed on the opposite side of the back panel is a respective stabilization member of another shelf bracket.

8. A shelving assembly comprising:
   a. A weighing assembly for weighing a shelf, the weighing assembly comprising:
      i. a shelf bracket comprising a horizontal member configured to support the shelf in an x-z plane that is parallel to a floor, and a first vertical member in a y-z plane orthogonal to the x-z plane, and ii. a load cell assembly fixedly attached to the horizontal member so as to mediate between the horizontal member and the shelf, the load cell assembly comprising:

A. a load cell body having a free end and an anchored portion, said load cell body including a spring element and at least one receiving element, and B. a strain-sensing gage, bonded to said spring element, said strain-sensing gage adapted to measure a strain in said spring element, wherein in an assembled configuration, (i) said load cell body is attached to said horizontal member at said anchored portion of the load cell body, and (ii) said at least one receiving element is adapted to receive a vertical load from the shelf, said receiving element has (A) and unloaded disposition, and (B) a loaded disposition in which said at least one receiving element receives said vertical load, wherein in said loaded disposition, said free end attains a depressed position with respect to said free end in said unloaded disposition;

b. a computing device; and c. a communications arrangement for sending information about the weight indication to the computing device, wherein the computing device includes a software module for determining, based on the information, that a product has been added to or removed from a shelf, wherein the product is a member of a group of non-homogeneous products, and the determining by the software module additionally includes identifying the product that has been added or removed from the shelf.

9. The shelving arrangement of claim 8, wherein the group of non-homogeneous products is characterized by a plurality of SKU-identifiers, and the identifying includes identifying a SKU-identifier.

10. The shelving arrangement of claim 8, wherein the result of the determining by the software module is further used to perform at least one of a retail sales transaction and an inventory adjustment in a computerized inventory system.

11. A weighing-assembly unit, comprising:

a. first and second weighing assemblies according to claim 8; and b. a shelf frame or at least one beam member joining respective said shelf brackets of said first and second weighing assemblies so as to form, in combination therewith, a rigid shelf frame.

12. The weighing-assembly unit of claim 11, additionally comprising a shelf installed upon an upward-facing surface of said rigid shelf frame, the shelf disposed to be in at least indirect contact with said respective load cell assemblies of said first and second weighing assemblies.

13. A shelving arrangement comprising:

a. a back panel;

b. a first and second uprights associated with said back panel; and c. the weighing-assembly unit of claim 11.

14. A method of tracking inventory of products on a shelf, the method comprising:

a. tracking weight of non-homogeneous products stored on the shelf, the shelf comprising a plurality of weighing assemblies, each weighing assembly comprising (i) a respective shelf bracket, and (ii) a respective load cell assembly fixedly attached to a horizontal member of said respective shelf bracket so as to mediate between the horizontal member and said shelf, said respective load cell assembly comprising: (A) a load cell body having a free end and an anchored portion, said load cell body including a spring element and at least one receiving element, and (B) a strain-sensing gage, bonded to said spring element, said strain-sensing gage adapted to measure a strain in said spring element, wherein said load cell base is attached to said load cell body at said anchored portion thereof;

b. in response to a change in weight of the products on the shelf, sending information about the weight of the products from at least one weighing assembly of said plurality of weighing assemblies to a computing device; and c. in response to receiving the information about the weight of the products:

i. determining, by the computing device, that a product has been added to or removed from the shelf, and ii. in response to the determining that a product has been added to or removed from the shelf, identifying the product added or removed, wherein the product is a member of a group of non-homogenous products.

15. The method of claim 14, wherein the products are characterized by a plurality of SKU-identifiers, and the identifying includes determining an SKU-identifier.

16. The method of claim 14, additionally comprising the step of recording a change in an inventory management system.

17. The method of claim 14, additionally comprising the step of completing a retail sales transaction, using the result of the determining and of the further determining.

* * * * *